US012036660B2

(12) United States Patent
Groves et al.

(10) Patent No.: US 12,036,660 B2
(45) Date of Patent: Jul. 16, 2024

(54) MODULAR STORAGE SYSTEM

(71) Applicant: TECHTRONIC CORDLESS GP, Anderson, SC (US)

(72) Inventors: Jeffrey Groves, Greenville, SC (US); J. Luke Jenkins, Williamston, SC (US); Stephen A. Hughett, Anderson, SC (US); Brianna E. Williams, Greenville, SC (US); Tyler H. Knight, Greenville, SC (US); Jason Porter Whitmire, Greenville, SC (US); Charles M. Wacker, II, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 1 day.

(21) Appl. No.: 17/396,282

(22) Filed: Aug. 6, 2021

(65) Prior Publication Data
US 2022/0040842 A1 Feb. 10, 2022

Related U.S. Application Data

(60) Provisional application No. 63/178,929, filed on Apr. 23, 2021, provisional application No. 63/164,145, (Continued)

(51) Int. Cl.
*B25H 3/00* (2006.01)
*B25H 1/02* (2006.01)
*F16M 13/02* (2006.01)

(52) U.S. Cl.
CPC ............... *B25H 3/00* (2013.01); *B25H 1/02* (2013.01); *F16M 13/02* (2013.01)

(58) Field of Classification Search
CPC ... B25H 3/00; B25H 1/02; B25H 1/12; B25H 3/06; B25H 1/16; B25H 3/02; B25H 3/04; A47F 5/0815
See application file for complete search history.

(56) References Cited

U.S. PATENT DOCUMENTS 1,524,415 A  1/1925 Uphus
2,089,999 A  8/1937 Greene
(Continued)

FOREIGN PATENT DOCUMENTS

AU   2015101015 B4   9/2015
CA      2792668 C   12/2013
(Continued)

OTHER PUBLICATIONS

Extended European Search Report for Application No. 21189978.6 dated Jun. 15, 2022 (12 pages).
(Continued)

*Primary Examiner* — Bradley Duckworth
(74) *Attorney, Agent, or Firm* — Dority & Manning, P.A.

(57) ABSTRACT

A storage support configured to support an object on a support surface. The storage support includes a mount and a plurality of cleats. The mount includes an upper edge and a lower edge. Each of the plurality of cleats includes a first upper cleat edge and a second upper cleat edge that is non-parallel relative to the first upper cleat edge. The first upper cleat edge is oriented non-parallel relative to the upper edge of the mount. Each of the first upper cleat edge and the second upper cleat edge are configured to support the object.

27 Claims, 37 Drawing Sheets

Related U.S. Application Data filed on Mar. 22, 2021, provisional application No. 63/071,920, filed on Aug. 28, 2020, provisional application No. 63/062,865, filed on Aug. 7, 2020.

(56) References Cited

U.S. PATENT DOCUMENTS

| | | | |
|---|---|---|---|
| 2,541,828 A | 2/1951 | Peck | |
| 2,695,105 A | 11/1954 | Mitchell | |
| 2,755,156 A | 7/1956 | Grigsby | |
| 3,504,405 A | 4/1970 | Cecily | |
| 3,866,547 A | 2/1975 | Guyton | |
| 4,119,285 A | 10/1978 | Bisping et al. | |
| 4,155,609 A * | 5/1979 | Skafte | B25H 1/12 D6/555 |
| 4,313,385 A | 2/1982 | Fitzgerald | |
| 4,919,498 A | 4/1990 | Turner | |
| 4,995,323 A | 2/1991 | Kellems et al. | |
| 5,085,608 A | 2/1992 | Turner | |
| 5,170,719 A | 12/1992 | Pestone | |
| 5,193,706 A | 3/1993 | Hanna et al. | |
| 5,359,752 A | 11/1994 | Domenig | |
| 5,482,168 A | 1/1996 | Welch et al. | |
| 5,503,277 A | 4/1996 | O'Brien | |
| 5,505,302 A | 4/1996 | Ferley | |
| 5,513,574 A | 5/1996 | Collins | |
| 5,584,254 A | 12/1996 | Williams | |
| 5,601,196 A | 2/1997 | Heer et al. | |
| 5,657,974 A | 8/1997 | Williams | |
| 5,669,515 A | 9/1997 | Tisbo et al. | |
| 5,799,915 A | 9/1998 | Morey | |
| 5,988,408 A | 11/1999 | Evans et al. | |
| 6,039,416 A * | 3/2000 | Lambert | A47B 5/06 D6/684 |
| 6,131,866 A | 10/2000 | Kesinger | |
| 6,161,486 A | 12/2000 | Boots | |
| 6,499,608 B1 | 12/2002 | Sterling et al. | |
| 6,564,949 B1 | 5/2003 | Saathoff | |
| 6,702,128 B2 * | 3/2004 | Winig | A47B 96/067 211/183 |
| 6,769,674 B2 | 8/2004 | Chang | |
| 6,786,162 B1 | 9/2004 | Volkmer et al. | |
| 6,811,043 B2 | 11/2004 | Perkins et al. | |
| 6,811,233 B1 | 11/2004 | Packer | |
| 6,926,160 B2 | 8/2005 | Perkins et al. | |
| 7,055,703 B2 | 6/2006 | Perkins et al. | |
| 7,090,210 B2 | 8/2006 | Lawrence et al. | |
| 7,147,115 B2 | 12/2006 | Perkins et al. | |
| 7,228,977 B2 | 6/2007 | Perkins et al. | |
| 7,270,242 B2 | 9/2007 | Liu | |
| 7,296,695 B2 | 11/2007 | Perkins et al. | |
| 7,350,549 B2 | 4/2008 | Carter | |
| 7,380,778 B2 | 6/2008 | Lawrence et al. | |
| 7,424,958 B1 * | 9/2008 | Eley | A47F 5/0815 211/70.6 |
| 7,540,312 B2 | 6/2009 | Carter | |
| 7,565,922 B2 | 7/2009 | Carter | |
| 7,604,027 B2 * | 10/2009 | Thatcher | B25H 1/04 144/287 |
| 7,712,493 B2 | 5/2010 | Carter | |
| 7,730,916 B2 | 6/2010 | Carter | |
| 7,757,869 B2 | 7/2010 | Lawson | |
| 7,775,492 B2 | 8/2010 | Pierzynski et al. | |
| 7,798,338 B2 | 9/2010 | Maheu et al. | |
| 7,845,604 B2 | 12/2010 | Connor, Jr. | |
| 7,909,073 B2 | 3/2011 | Carter | |
| 7,946,320 B2 | 5/2011 | Carter | |
| 8,042,794 B2 | 10/2011 | Marshall et al. | |
| 8,061,539 B2 | 11/2011 | Punzel et al. | |
| 8,066,042 B2 | 11/2011 | Carter | |
| 8,152,149 B2 | 4/2012 | Lawrence et al. | |
| 8,191,845 B1 | 6/2012 | Yu | |
| 8,231,119 B2 | 7/2012 | Marshall et al. | |
| 8,267,363 B2 | 9/2012 | Begic et al. | |
| 8,434,835 B2 | 5/2013 | Hardy et al. | |
| 8,464,994 B2 | 6/2013 | Chiu | |
| 8,500,078 B2 | 8/2013 | Castellanos | |
| 8,528,871 B2 | 9/2013 | Begic et al. | |
| 8,579,320 B2 | 11/2013 | Chiu | |
| 8,651,030 B2 | 2/2014 | Coffman | |
| 8,740,207 B2 | 6/2014 | Lawrence et al. | |
| 8,826,829 B2 | 9/2014 | Taylor | |
| 9,206,827 B2 | 12/2015 | Loree et al. | |
| 9,486,913 B2 | 11/2016 | Thieman | |
| 9,616,562 B2 | 4/2017 | Hoppe et al. | |
| 9,775,450 B2 | 10/2017 | Will et al. | |
| 10,093,449 B2 | 10/2018 | Han et al. | |
| 10,143,316 B2 | 12/2018 | Will et al. | |
| 10,492,631 B2 | 12/2019 | Velderman et al. | |
| 10,562,174 B2 | 2/2020 | Omry et al. | |
| 10,634,279 B2 | 4/2020 | Lu et al. | |
| 10,667,609 B2 | 6/2020 | Haines | |
| 10,743,685 B2 | 8/2020 | Will et al. | |
| 10,925,412 B2 | 2/2021 | Velderman et al. | |
| 11,006,749 B2 | 5/2021 | Anderson | |
| 2004/0032190 A1 | 2/2004 | Condas | |
| 2004/0251227 A1 | 12/2004 | Perkins et al. | |
| 2004/0261667 A1 | 12/2004 | Ma | |
| 2005/0263039 A1 | 12/2005 | Frampton et al. | |
| 2005/0269276 A1 | 12/2005 | Pfeiffer | |
| 2006/0102569 A1 | 5/2006 | Laga | |
| 2006/0119237 A1 | 6/2006 | Packer | |
| 2007/0125731 A1 | 6/2007 | Waterman | |
| 2008/0000853 A1 | 1/2008 | Huang | |
| 2008/0006592 A1 | 1/2008 | Brooks | |
| 2008/0054142 A1 | 3/2008 | Deland | |
| 2008/0128373 A1 | 6/2008 | Chang et al. | |
| 2008/0179267 A1 | 7/2008 | Johnson | |
| 2008/0257840 A1 | 10/2008 | Eley | |
| 2009/0000522 A1 | 1/2009 | Collins et al. | |
| 2009/0020487 A1 | 1/2009 | Wood | |
| 2009/0145866 A1 | 6/2009 | Panosian et al. | |
| 2009/0283021 A1 | 11/2009 | Wong | |
| 2009/0304439 A1 | 12/2009 | Sohn et al. | |
| 2010/0219144 A1 | 9/2010 | Salmon et al. | |
| 2010/0300996 A1 | 12/2010 | Kao | |
| 2011/0062295 A1 | 3/2011 | Totman | |
| 2011/0100939 A1 | 5/2011 | Friesch | |
| 2011/0234072 A1 | 9/2011 | Hightower | |
| 2011/0303798 A1 | 12/2011 | Bader et al. | |
| 2012/0012726 A1 | 1/2012 | Daniels | |
| 2013/0000525 A1 | 1/2013 | Hall et al. | |
| 2013/0047386 A1 | 2/2013 | Barfoot et al. | |
| 2013/0320180 A1 | 12/2013 | Castellanos | |
| 2013/0334383 A1 | 12/2013 | Begic et al. | |
| 2014/0001325 A1 | 1/2014 | Friesch | |
| 2014/0263119 A1 | 9/2014 | Gruger et al. | |
| 2015/0068990 A1 | 3/2015 | Shea | |
| 2016/0016304 A1 | 1/2016 | Zhu | |
| 2017/0274522 A1 | 9/2017 | Kao | |
| 2018/0132610 A1 | 5/2018 | Lu et al. | |
| 2018/0132611 A1 | 5/2018 | Lu et al. | |
| 2019/0231072 A1 | 8/2019 | Cattaneo | |
| 2019/0307268 A1 | 10/2019 | Stas | |
| 2019/0387902 A1 * | 12/2019 | Peck | F21V 21/35 |
| 2020/0069082 A1 * | 3/2020 | Altizer | B25H 3/04 |
| 2020/0165036 A1 | 5/2020 | Squiers et al. | |
| 2020/0391372 A1 | 12/2020 | Strempke et al. | |
| 2021/0127855 A1 | 5/2021 | Velderman et al. | |
| 2021/0221561 A1 | 7/2021 | Davidian et al. | |

FOREIGN PATENT DOCUMENTS

| | | |
|---|---|---|
| CN | 203524102 U | 4/2014 |
| CN | 204169298 U | 2/2015 |
| CN | 204273633 U | 4/2015 |
| CN | 204317884 U | 5/2015 |
| CN | 104720281 A | 6/2015 |
| CN | 104720282 A | 6/2015 |
| CN | 204764590 U | 11/2015 |
| CN | 204819421 U | 12/2015 |
| CN | 205106777 U | 3/2016 |
| CN | 205214598 U | 5/2016 |
| CN | 205410242 U | 8/2016 |

(56) References Cited

FOREIGN PATENT DOCUMENTS

| | | |
|---|---|---|
| CN | 206197478 U | 5/2017 |
| CN | 208084294 U | 11/2018 |
| CN | 108926112 A | 12/2018 |
| CN | 208529073 U | 2/2019 |
| CN | 208769072 U | 4/2019 |
| CN | 110238803 A | 9/2019 |
| CN | 209563742 U | 11/2019 |
| CN | 209566095 U | 11/2019 |
| CN | 209769464 U | 12/2019 |
| CN | 210189709 U | 3/2020 |
| CN | 210276485 U | 4/2020 |
| CN | 210414428 U | 4/2020 |
| CN | 210500148 U | 5/2020 |
| CN | 210500219 U | 5/2020 |
| CN | 210520363 U | 5/2020 |
| CN | 210589135 U | 5/2020 |
| CN | 212117442 U | 12/2020 |
| CN | 212146294 U | 12/2020 |
| CN | 212287520 U | 1/2021 |
| DE | 1942096 U | 7/1966 |
| DE | 8800330 U1 | 4/1988 |
| DE | 29515948 U1 | 2/1996 |
| DE | 202004008020 U1 | 9/2004 |
| DE | 102004002688 B4 | 5/2006 |
| DE | 202012000573 U1 | 10/2012 |
| DE | 202017102622 U1 | 8/2018 |
| EP | 0107541 B1 | 12/1986 |
| EP | 0611633 A1 | 8/1994 |
| EP | 1232705 A2 | 8/2002 |
| EP | 1872694 A1 | 1/2008 |
| EP | 2084996 A2 | 8/2009 |
| EP | 3064088 B1 | 4/2019 |
| ES | 1060465 U | 9/2005 |
| FR | 2470661 A1 | 6/1981 |
| GB | 590162 A | 7/1947 |
| GB | 1582866 A | 1/1981 |
| GB | 2282343 B | 6/1997 |
| GB | 2366228 B | 11/2003 |
| GB | 2427168 A | 12/2006 |
| KR | 19990018493 U | 6/1999 |
| MX | 2008007163 A | 3/2009 |
| NL | 8301781 A | 12/1984 |
| WO | WO9413438 A1 | 6/1994 |
| WO | WO2012065776 A1 | 5/2012 |
| WO | WO2012163441 A1 | 12/2012 |
| WO | WO2015173217 A1 | 11/2015 |
| WO | WO2015173218 A1 | 11/2015 |
| WO | WO2016092138 A1 | 6/2016 |

OTHER PUBLICATIONS

American Van, "Backsaver Work Station," <https://www.americanvan.com> web page visited Mar. 22, 2021.
Third Party Letter received on Aug. 7, 2023 (2 Pages).

* cited by examiner

MODULAR STORAGE SYSTEM

CROSS-REFERENCE TO RELATED APPLICATIONS

This application claims priority to co-pending U.S. Provisional Patent Application No. 63/178,929, filed Apr. 23, 2021, co-pending U.S. Provisional Patent Application No. 63/164,145, filed Mar. 22, 2021, co-pending U.S. Provisional Patent Application No. 63/071,920, filed Aug. 28, 2020, and co-pending U.S. Provisional Patent Application No. 63/062,865, filed Aug. 7, 2020, the entire contents of which are incorporated herein by reference.

TECHNICAL FIELD

The present disclosure relates to storage systems, and more particular to modular wall mounted storage systems for tools and the like.

BACKGROUND

Hand tools, power tools, and associated accessories such as batteries, tool bits, fasteners, and the like, may be moved frequently between a storage space and a work space. One aspect of accessibility is a user's ability to quickly store an object and remove the object from storage. Another aspect of accessibility is the storage system's ability to engage many objects with a standardized connection mechanism between the system and the object. This may also permit an object to engage the storage system at a plurality of locations. Storage systems may also be accessible for extension or expansion. Finally, storage systems are accessible when located adjacent a work space.

SUMMARY

In one independent aspect, a storage support configured to support an object on a support surface, the storage support comprising a mount including an upper edge and a lower edge, and a plurality of cleats. Each of the cleats project from the surface. Each of the cleats include a first upper cleat edge and a second upper cleat edge that is non-parallel relative to the first upper cleat edge. The first upper cleat edge is oriented non-parallel relative to the upper edge of the mount. Each of the first upper cleat edge and the second upper cleat edge are configured to support the objects.

In another independent aspect, a modular storage system is configured to support an object on a support surface. The modular support system comprises a mount, a bracket, and a retaining member. The mount includes a surface, a plurality of cleats projecting from the surface, and a retention feature. The bracket is used for removably supporting the object. The bracket includes a bracket hook configured to engage a portion of at least one of the cleats to secure the bracket to the mount. The retaining member is configured to engage the retention feature to inhibit disengagement of the bracket hook from the cleat.

In another independent aspect, a modular storage system is configured to support an object on a support surface. The modular support system comprises a mount, a bracket, and a workbench. The mount includes a plurality of cleats, each of the plurality of cleats including an outstanding portion projecting from the mount. The bracket is secured to a mounting attachment. The bracket is configured to engage the outstanding portion of the cleat to secure the bracket to the mount. The workbench is pivotally coupled to the mounting attachment for movement between a stored position, in which the workbench is generally parallel with the support surface, and a deployed position, in which the workbench is generally perpendicular with the support surface.

Other aspects of the disclosure will become apparent by consideration of the detailed description and accompanying drawings.

DETAILED DESCRIPTION

Before any aspects are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, whether direct or indirect.

Figure 1:
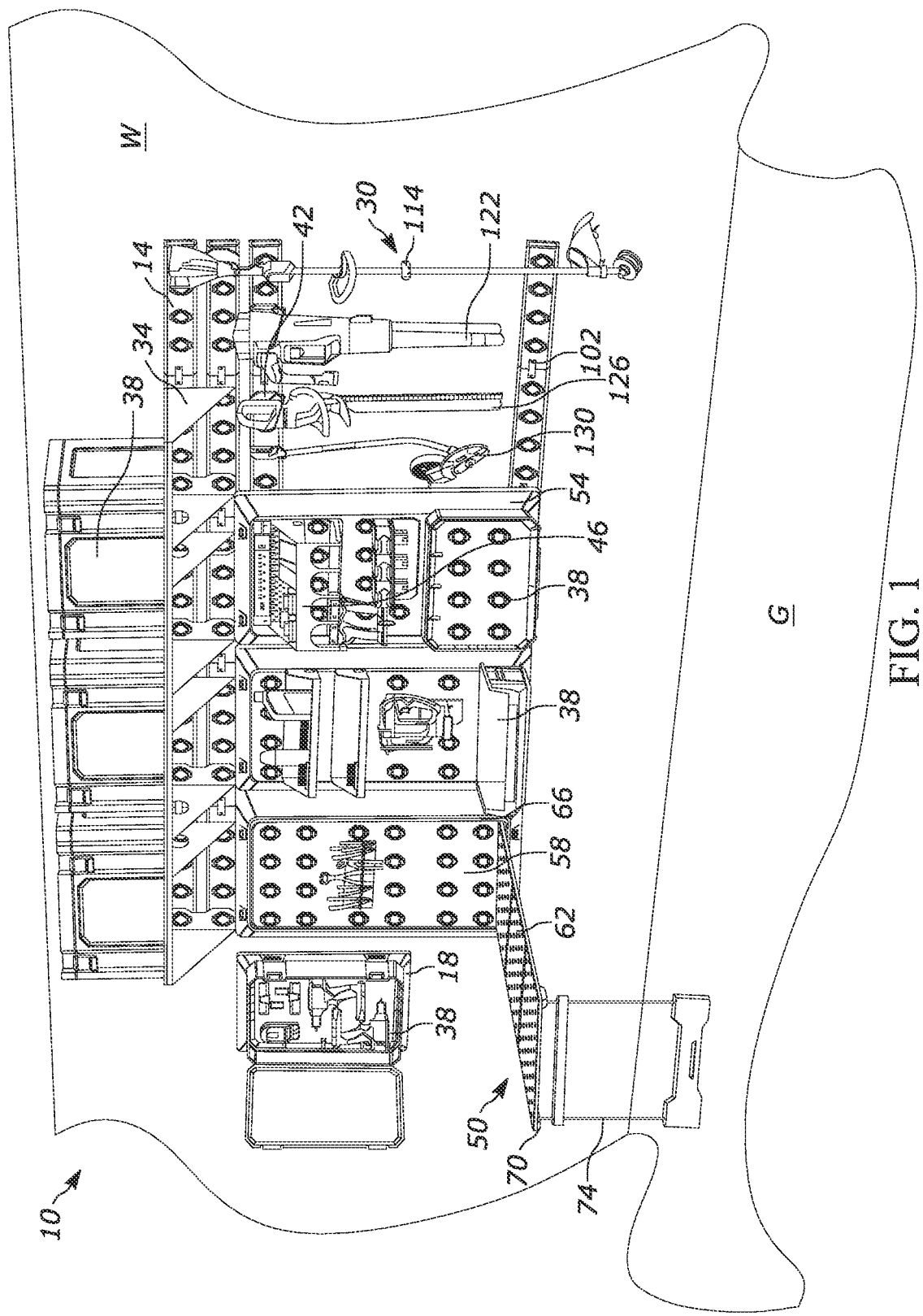
FIG. 1 is a perspective view of a multi-level wall organization system including a rail and a panel.

FIG. 1 illustrates a multi-level wall organization system 10 including one or more rails 14 and/or panel 18. In the illustrated system 10, multiple rails 14 are supported on a support surface or wall W. Similarly, in the illustrated system 10, multiple panels 18 are supported on the wall W. Each rail 14 and panel 18 includes at least one cleat 22. In the illustrated embodiment, the cleat 22 is a diamond-shaped cleat 22. In other embodiments, the cleat 22 may have another shape (e.g., hexagonal, octagonal).

The cleat 22 is configured to engage and support many types of objects 30 including, but not limited to, shelves 34, storage boxes 38, hanging attachments 42, tool holders 46, workbenches 50, tools, and the like. Each object 30 includes an opening 26 having a shape that corresponds to and receives the cleat 22. The engagement between the cleat 22 and the object 30 may be a locking engagement, or a gravitational engagement similar to a French cleat. As such, the objects 30 can be attached to the support surface (e.g., a wall W) through either the rail 14 or the panel 18. The rail 14 and the panel 18 each include at least one cleat 22 which may support an object 30 on the wall W. The storage boxes 38 can be stackable containers and may include an engagement interface and/or locking mechanism for securing the box 38 to the rail 14 or panel 18. Some examples of such engagement interfaces and locking mechanisms are described in U.S. Patent Application No. 63/030,694, filed on May 27, 2020, the entire contents of which are incorporated herein by reference.

In the illustrated embodiment, rail-supported panels 54 are supported with respect to the wall W via the rails 14. Such rail-supported panels 54 include the receiver 26 dimensioned to engage the cleat 22 of the rail 14. The rail-supported panels 54 further include cleats 22 configured to support the objects 30. Thus, each object 30 can be supported with respect to the wall W by either the rail 14 or by the rail-supported panel 54. As will be discussed with respect to FIG. 2, the rails 14 are modular in nature, and can be mounted on the wall W at a desired height with respect to a secondary support surface or ground G.

FIG. 1 illustrates a workbench 50 fastened to the wall W through a rail-supported panel 54 and a rail 14. In other embodiments, the workbench 50 may be fastened to the wall W by a panel 18 alone. The workbench 50 includes a fixed portion 58 and a movable portion 62. The fixed portion 58 engages one of the rail 14, the panel 18, or the rail-supported panel 54 and is secured relative to the wall W. In the illustrated embodiment, the fixed portion 58 of the workbench 50 engages the rail-supported panel 54. Other configurations are possible, such as the workbench 50 being removable from the rail 14, the panel 18, or the rail-supported panel 54. The movable portion 62 is connected to the fixed portion 58 by a first hinge 66. The movable portion 62 is movable relative to the fixed portion 58 between a storage position in which the movable portion 62 of the workbench 50 is oriented generally parallel to the wall W and an extended position (shown in FIG. 1) in which the movable portion 62 of the workbench 50 is oriented at an oblique angle (e.g., perpendicular) relative to the support surface W. In the extended position, the movable portion 62 functions as a work surface or work space of the workbench 50. In some embodiments, the workbench 50 may include a work surface formed by a plurality of modular table sections that can be removably coupled (e.g., by fasteners) to a frame, depending on a type of operation to be performed.

In the illustrated embodiment, a leg 74 is connected (e.g., by a second hinge 70) to a distal end of the movable portion 62 relative to the first hinge 66. The leg 74 may be moved between an extended position in which the leg 74 engages the ground G and a storage position in which the leg 74 extends generally parallel to the movable portion 62. When the leg 74 engages the ground G with the table in the extended position, the leg 74 further supports the workbench 50.

Figure 2:
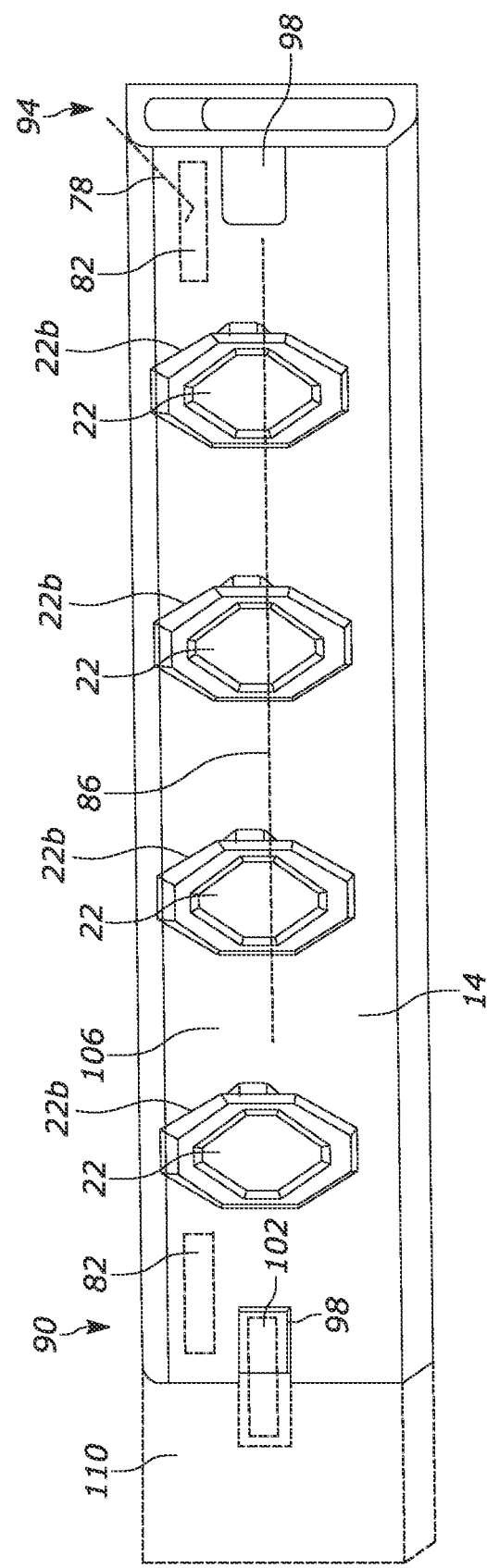
FIG. 2 is a perspective view of the rail of FIG. 1.

FIG. 2 illustrates a rail 14 including cleats 22. The wall organization system 10 includes a support fastener 78 which engages the wall W to support the rail 14 relative to the wall W and to transmit loads exerted on the rail 14 to the wall W. The support fastener 78 engages a fastener slot 82 of the rail 14. The rail 14 may include multiple fastener slots 82 at regular distances along a longitudinal axis 86 extending between a first end 90 of the rail 14 and a second end 94 of the rail 14. The distance between the fastener slots 82 corresponds generally to standard stud spacing dimensions within walls W such that fasteners can engage studs of the wall W.

In the illustrated embodiment (FIG. 2), the rail 14 includes a plurality of cleats 22 which may be arranged at regular distances along the longitudinal axis 86 of the rail 14. The rail 14 has a rail extension receiver 98 at both the first end 90 and the second end 94. The cleats 22 closest to the first end 90 and the second end 94 of the rail 14 are positioned along the longitudinal axis 86 such that the gap between the cleat 22 closest to the first end 90 and the first end 90 is equal in length to the gap between the cleat 22 closest to the second end 94 and the second end 94. As a result, spacing between cleats 22 of the rail 14 and an adjacent rail 14 may be regular (i.e., uniform). The longitudinal axis 86 of the rail 14 intersects the rail extension receiver 98. A rail extension 102 may engage a rail segment 106 and an adjacent rail segment 110 to extend the rail 14 along the longitudinal axis 86. As such, additional adjacent rails 14 may be attached to an existing segment rail 14 to extend the length of a rail 14 along the longitudinal axis 86.

Figure 3:
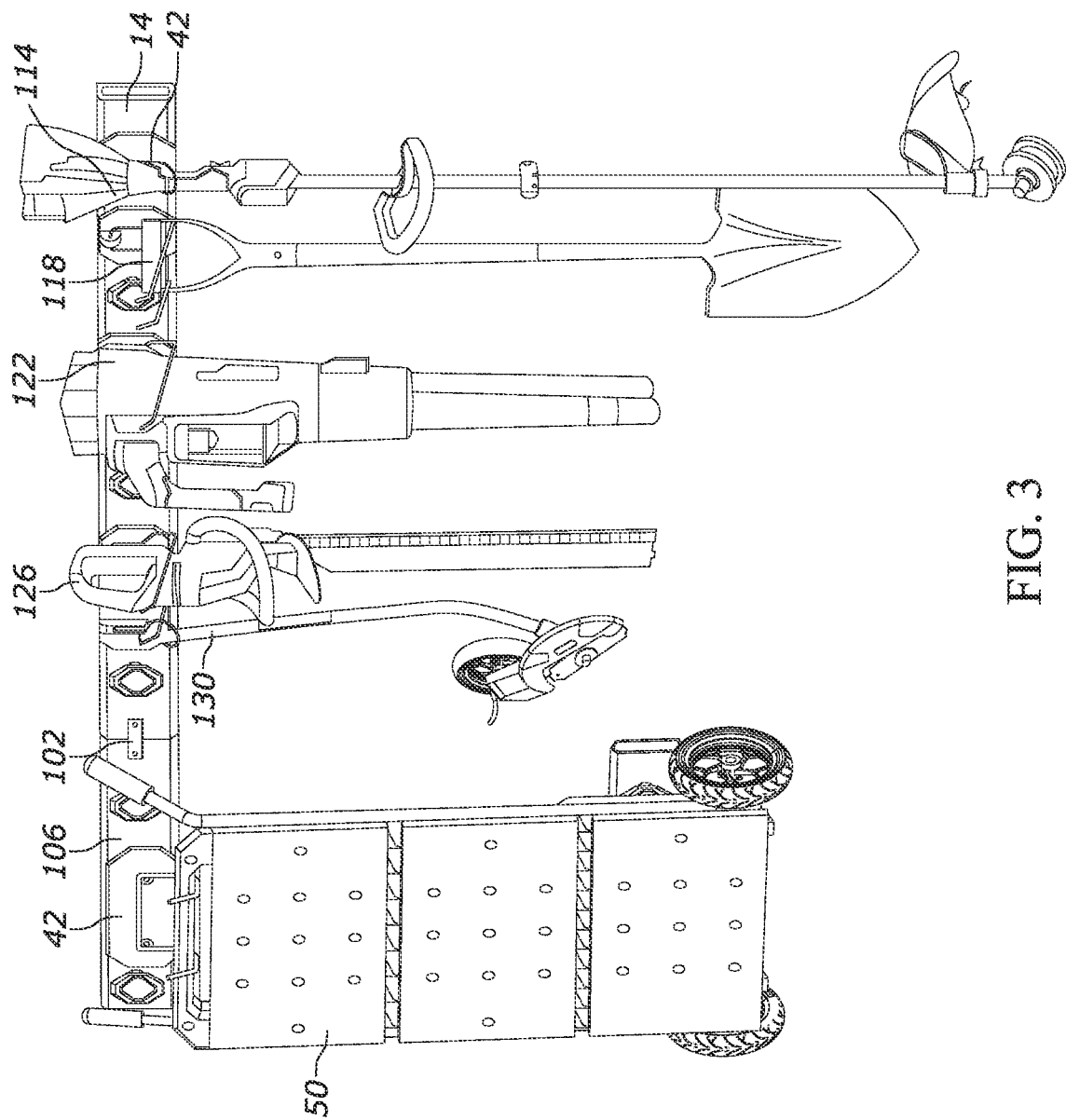
FIG. 3 is a perspective view of a wall organization system including a rail.

FIG. 3 illustrates a wall organization system 10 including a rail 14. The rail 14 includes multiple rail segments 106, 110 connected by rail extensions 102. Each rail segment 106 may be separately secured to the wall W by a respective support fastener 78. The illustrated wall organization system 10 supports multiple objects 30. The objects 30 illustrated in FIG. 3 include a string trimmer 114, a shovel 118, a blower 122, a hedge trimmer 126, an edger 130, and the workbench 50. Other objects 30 are capable of being supported on the rail 14. As previously discussed, the hanging attachment 42 may engage the cleat 22. Various hanging attachments 42 can serve as an intermediate between any given object 30 and the rail 14. The hanging attachments 42 may include but are not limited to fixed "U", "T", "J" or otherwise shaped brackets, hinges, or other fixed or movable components to enhance a user's ability to quickly support or remove the object 30 from the rail 14.

Figure 4:
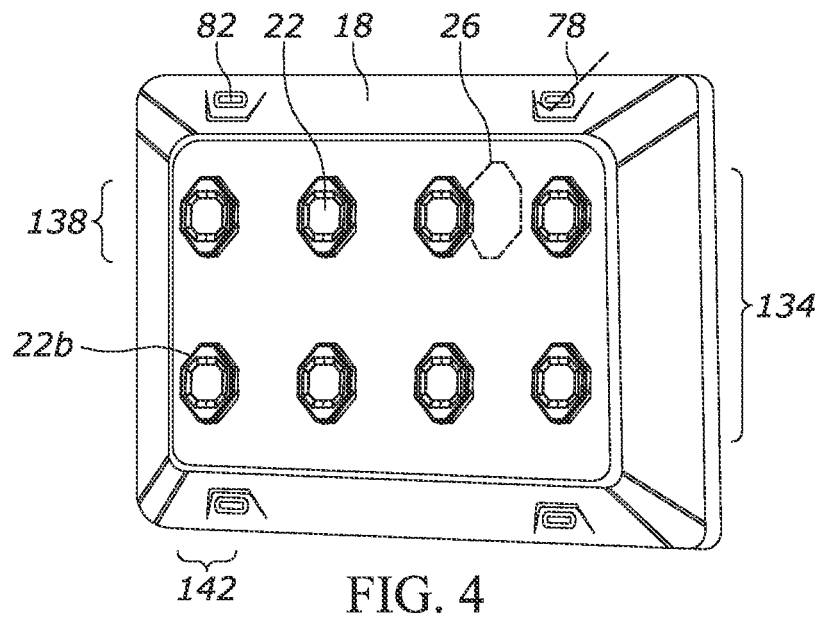
FIG. 4 is a perspective view of a panel of FIG. 1.

FIG. 4 illustrates the panel 18. The panel 18 includes an array 134 of cleats 22. Each cleat 22 is shaped with the same shape of the cleats 22 of the rail 14 such that an object 30 may engage either a rail 14 or a panel 18. In the illustrated embodiment, the array 134 includes multiple rows 138 and multiple columns 142, and the rows 138 and the columns 142 of the panel are evenly spaced. In the illustrated embodiment, the array 134 includes two rows 138 and four columns 142, with a total of eight cleats 22. The panel 18 includes fastener slots 82 which permit support fasteners 78 to extend therethrough to engage the wall W. The fastener slots 82 are spaced at regular distances along the rows 138 which correspond generally to standard stud spacing dimensions within walls W such that fasteners can be supported on studs of the wall W. The panel 18 includes at least one receiver 26 capable of engaging a cleat 22 of a rail 14. As such, the panel 18 may function as either a wall W supported panel 18 or a rail supported panel 54.

Figure 5:
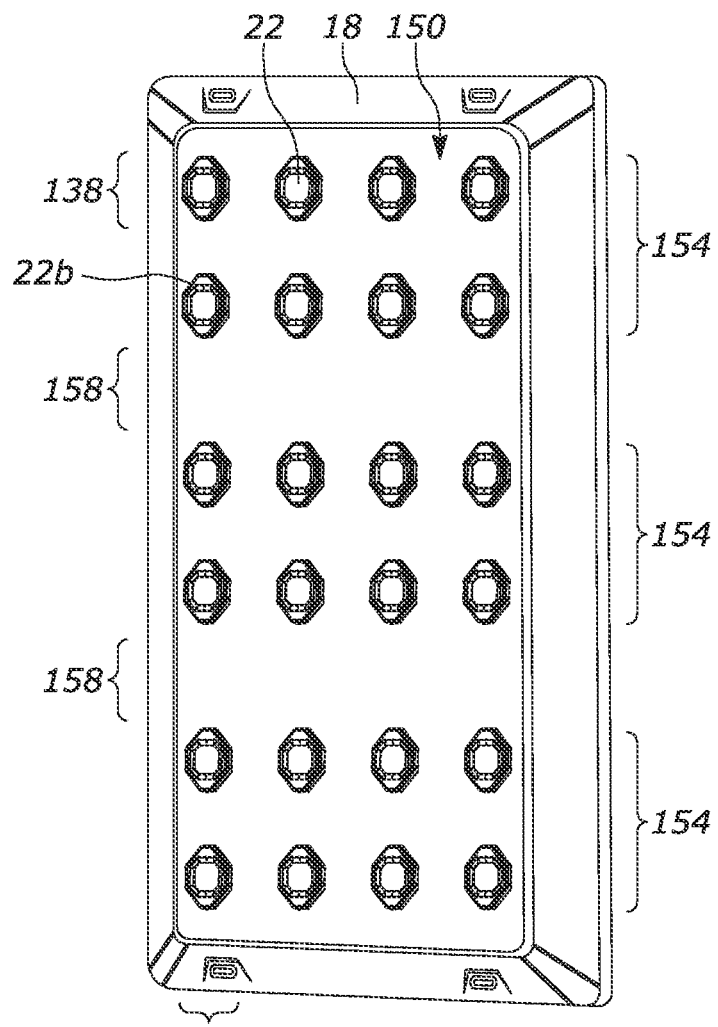
FIG. 5 is a perspective view of a panel having a different dimension than the panel of FIG. 4.

In other embodiments, the panel 18 may include fewer or more cleats 22. For example, as shown in FIG. 5 the panel 18 may include six rows and four columns. In some embodiments, the cleats 22 may be arranged in an array 150 consisting of multiple sub-arrays 154, which may be generally similar to the array 134 of the smaller panel 18. For example, each sub-array 154 of the panel of FIG. 5 includes two rows 138 and four columns 142, but fewer or more rows 138 and columns 142 in the sub-array 154, as well as other arrangements of the cleats 22, are possible.

Figure 6:
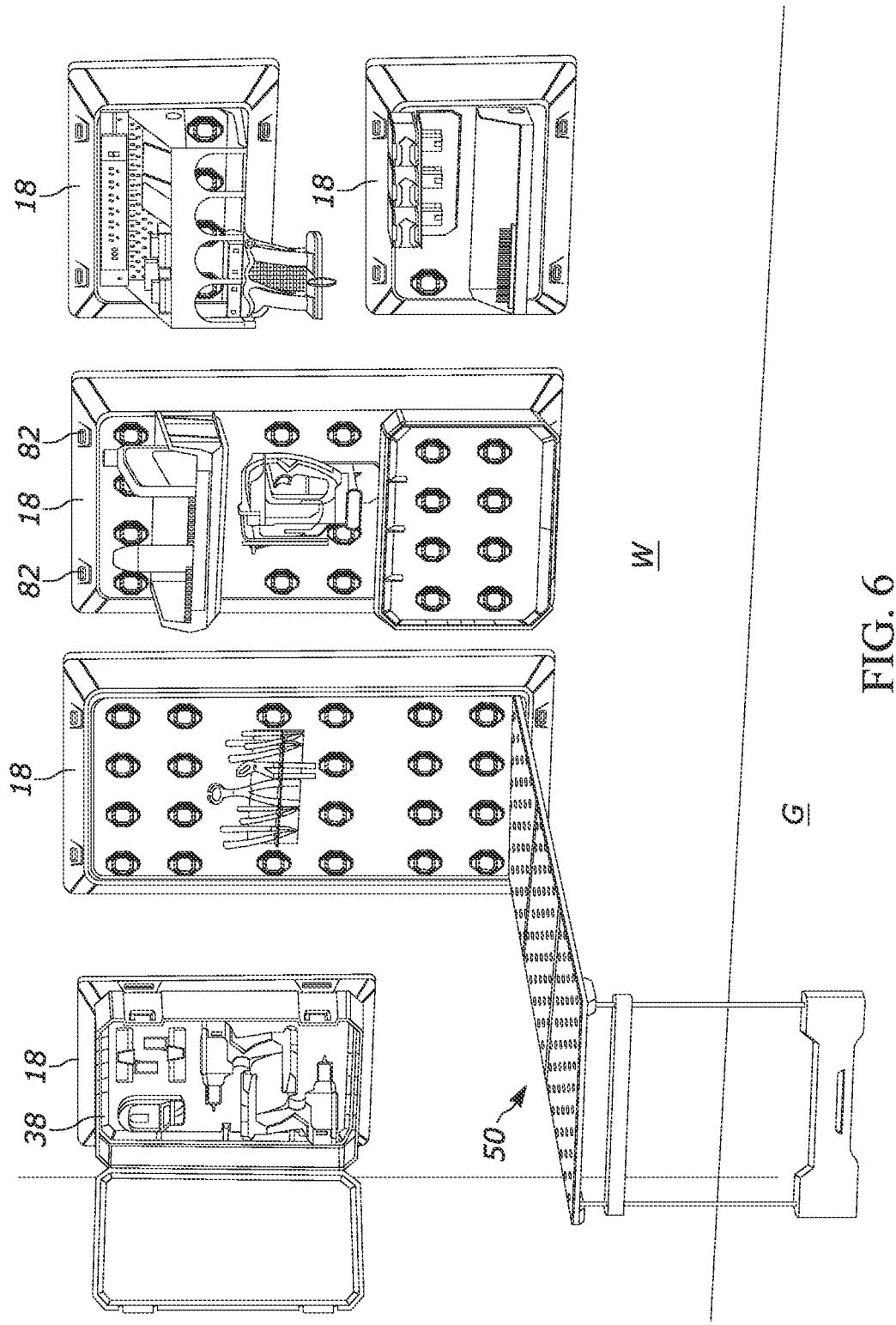
FIG. 6 is a perspective view of a wall organization system including a panel.

FIG. 6 illustrates a wall organization system 10 including a panel 18. In the illustrated embodiment, multiple panels 18 are separately secured to the wall W by one or more respective support fastener(s) 78 extending through a respective fastener slot 82. The illustrated wall organization system 10 includes multiple types of objects 30 secured to the panels 18. One of the objects 30 is a workbench 50. Other objects include racks for supporting tools and/or battery packs; shelves; and toolboxes.

Figure 7:
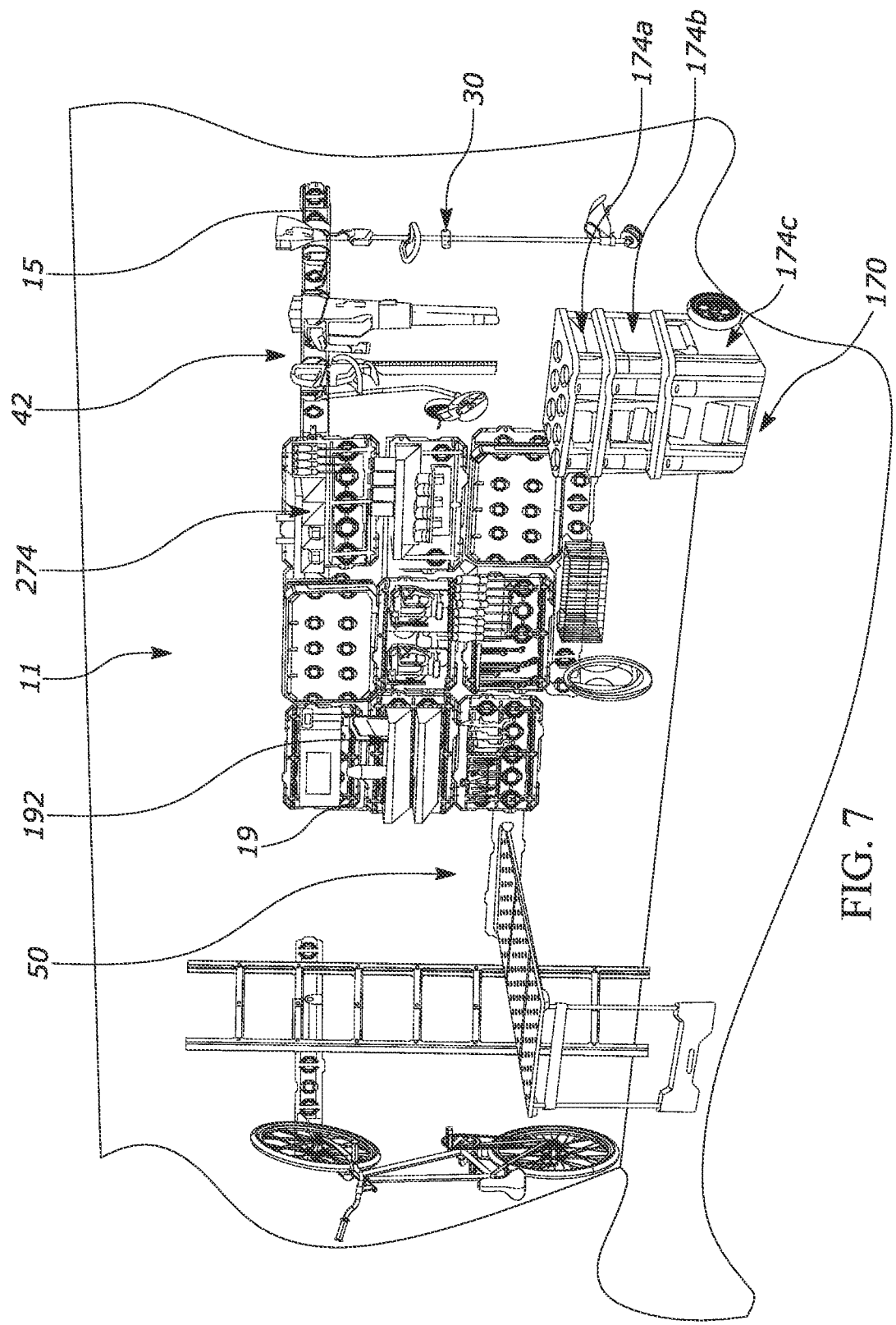
FIG. 7 is a perspective view of a different embodiment of a wall organization system including a rail and a panel.

FIG. 7 illustrates another embodiment of a wall organization system 11 including an elongated panel or rail 15 and a panel 18'. In the wall organization system 11, both the rail 15 and the panel 18' include at least one male mating feature 162 and at least one female mating feature 166, each positioned on the periphery of the rail 15 or panel 18'. As such, in the wall organization system 11, the rail 15 can engage the panel 18' through respective male and female mating features 162, 166. The rails 15 and panels 18' include cleats 22 as described with reference to the rails 14 and panels 18 of the wall organization system 10. The cleats 22 are configured to engage many different objects 30.

The wall organization system 11 may further include a hand truck 170 for transporting tool boxes 174a, 174b, 174c between the wall organization system 11 and a worksite. The tool boxes 174a, 174b, 174c may be of different sizes and/or volumes, and may be removably supported on either a rail 15, a panel 18', or the hand truck 170. Each tool box 174a, 174b, 174c may further include cleats 22 to engage additional tool boxes 174a, 174b, 174c, or other objects 30.

Figure 8:
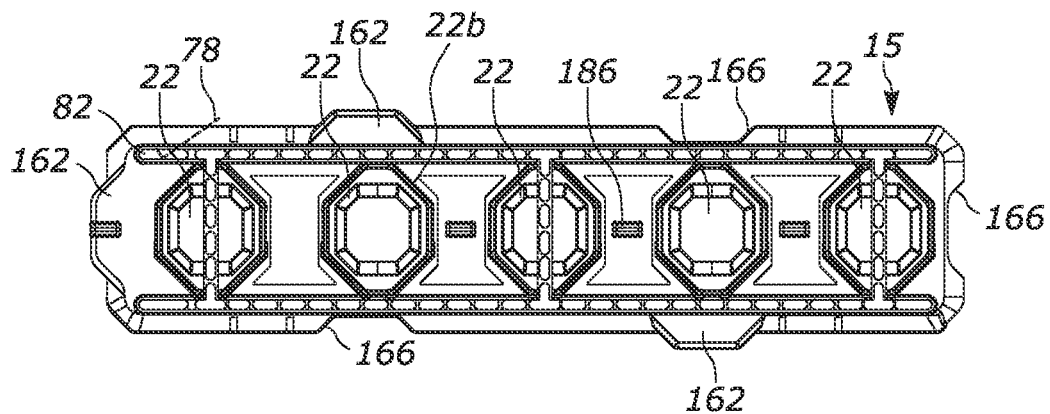
FIG. 8 is a perspective view of the rail of FIG. 7.

FIG. 8 illustrates the rail 15. The rail 15 includes cleats 22, at least one male mating feature 162, and at least one female mating feature 166. The rail 15 further includes fastener slots 82 through which a fastener 78 can extend to retain the rail 15 on a stud of the wall W. The rail 15 can be supported in a generally horizontal configuration as illustrated in FIG. 7 in which the rail 15 is oriented in a direction parallel to the ground G. Alternatively, the rail 15 can be supported in a generally vertical configuration in which the rail 15 is oriented in a direction perpendicular relative to the ground G.

Figure 9:
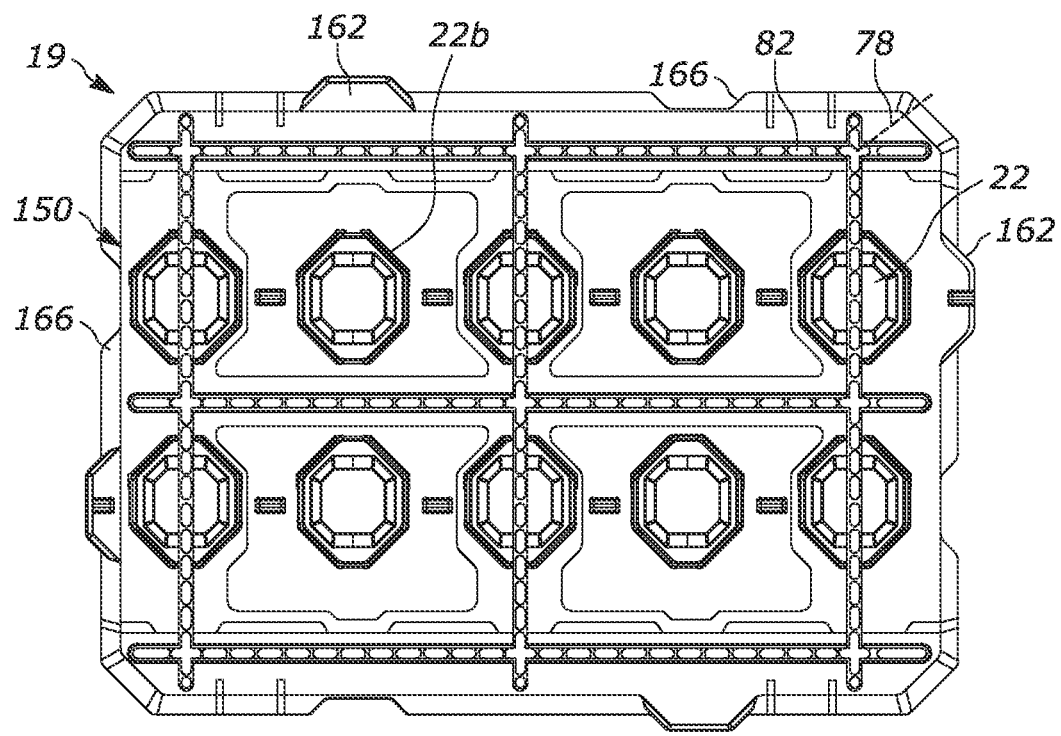
FIG. 9 is a perspective view of the panel of FIG. 7.

FIG. 9 illustrates the panel 19. The panel 19 includes cleats 22, at least one male mating feature 162, and at least one female mating feature 166. The panel 19 includes fastener slots 82 through which a fastener 78 can extend to retain the rail 15 on a stud of the wall W. The panel 19 includes an array 134 of cleats 22. The panel 19 may include multiple subarrays 154 of cleats 22 similar to the sub-arrays 150 of the panel 18. Cleats 22 of a given panel 19 may define half-cleats 22 which are operable to cooperate with adjacent panels 18' or rails 15 to form a full cleat 22 and support an object 30. The panels 18' illustrated in FIG. 7 are supported in a generally horizontal configuration in which longer sides of the panel 19 are oriented in a direction parallel to the ground G. Alternatively, the panel 19 can be supported in a generally vertical configuration in which longer sides of the panel 19 are oriented in a direction perpendicular relative to the ground G.

Figure 10:
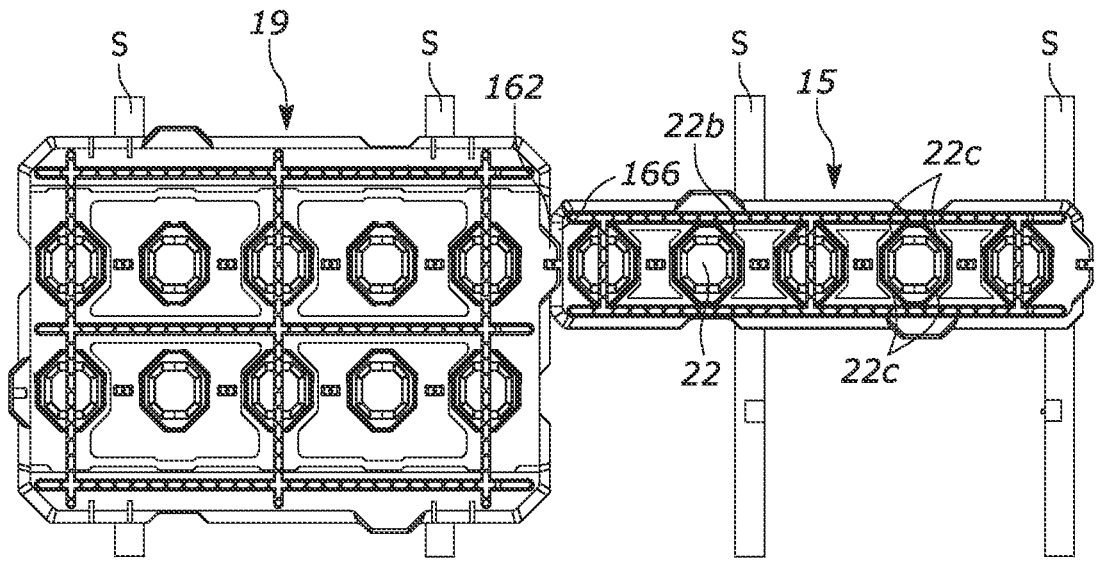
FIG. 10 is a front view of the rail and the panel of FIG. 7 shown as secured to each other and to studs of a wall.

FIG. 10 illustrates one of the male mating features 162 of the panel 19 engaging the female mating feature 166 of the rail 15. Further, FIG. 10 illustrates the location of studs S of the wall W. In the illustrated embodiment, the slots 82 of the rail 15 and the panel 19 are aligned in multiple rows and columns. The slots 82 provide multiple locations through which fasteners can support the rail/panel on the studs, and may also assist in positioning the rail/panel in a horizontal or vertical orientation prior to securing the rail/panel to the studs.

Figure 11:
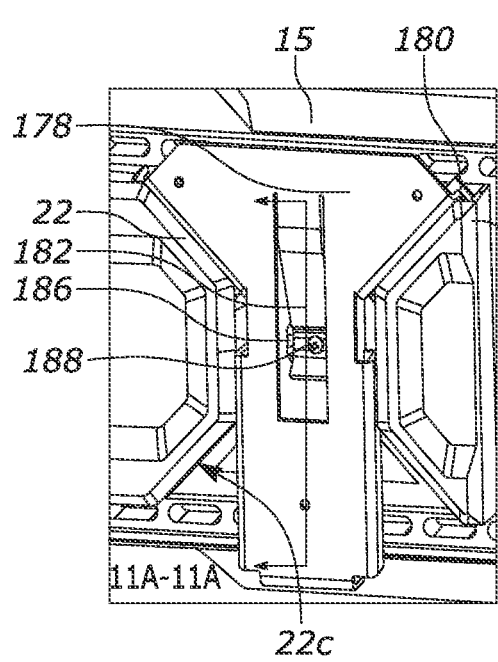
FIG. 11 is a perspective view of a mounting bracket of the wall organization system of FIG. 7.
Figure 11A:
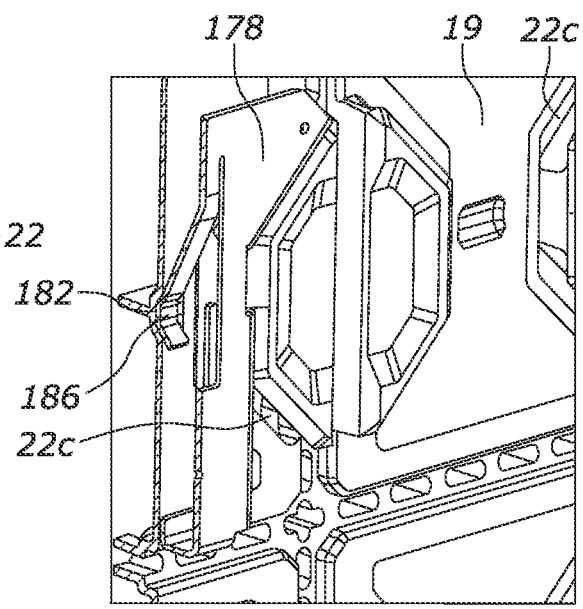
FIG. 11A is a cross-sectional view of the mounting bracket of FIG. 11 taken along section line 11A-11A in FIG. 11.

FIGS. 11 and 11A illustrate a mounting bracket 178. In FIG. 11, the mounting bracket 178 includes at least one bracket hook 180 which engages a portion of multiple cleats 22 of the rail 15 or the panel 19. In the illustrated embodiment, the mounting bracket 178 includes two hooks 180, with one bracket hook 180 engaging a portion of one cleat 22, and the second bracket hook 180 engaging a portion of an adjacent cleat 22. A tab 182 of the mounting bracket 178 engages a detent 186 positioned in the rail 15 or the panel 19 between two cleats. FIG. 11A illustrates the engagement between the tab 182 and the detent 186. The tab 182 is cantilevered relative to a body of the mounting bracket 178. As such, the tab 182 locks the location of the mounting bracket 178 relative to the cleats 22. Optionally, as shown in FIG. 11, the mounting bracket 178 may be fastened to the rail 15 or panel 19. In the illustrated embodiment, a fastener 188 extends through the tab 182 and connects the mounting bracket 178 to the rail 15. In some embodiments, the fastener 188 may fix the mounting bracket 178 to the wall W or a stud S.

Figure 12:
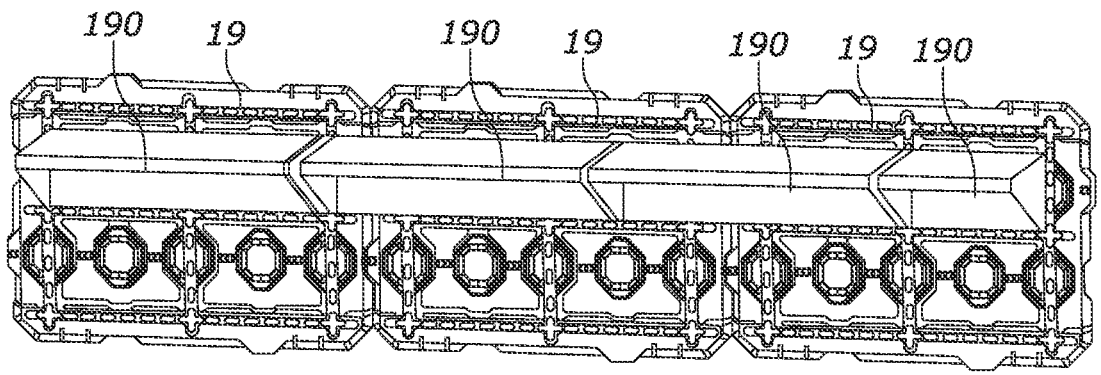
FIG. 12 is a perspective view of multiple panels of FIG. 9 shown engaged with each other and supporting multiple shelves.
Figure 13:
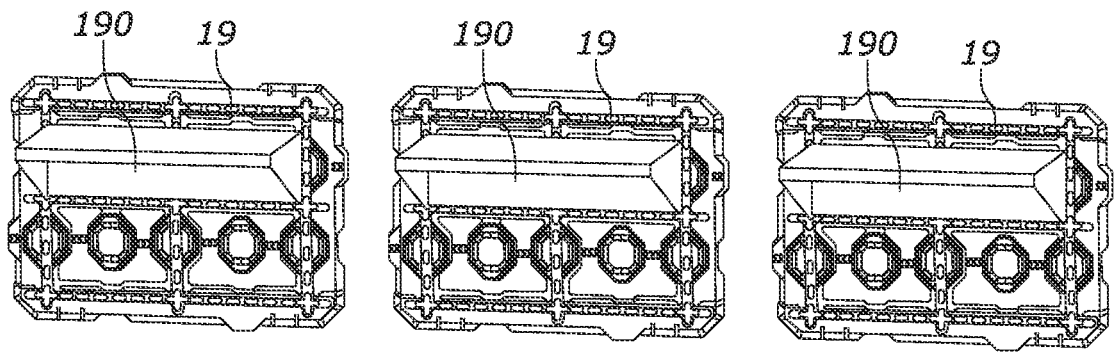
FIG. 13 is a perspective view of multiple panels of FIG. 9 shown separated from each other and each supporting a shelf.
Figure 14:
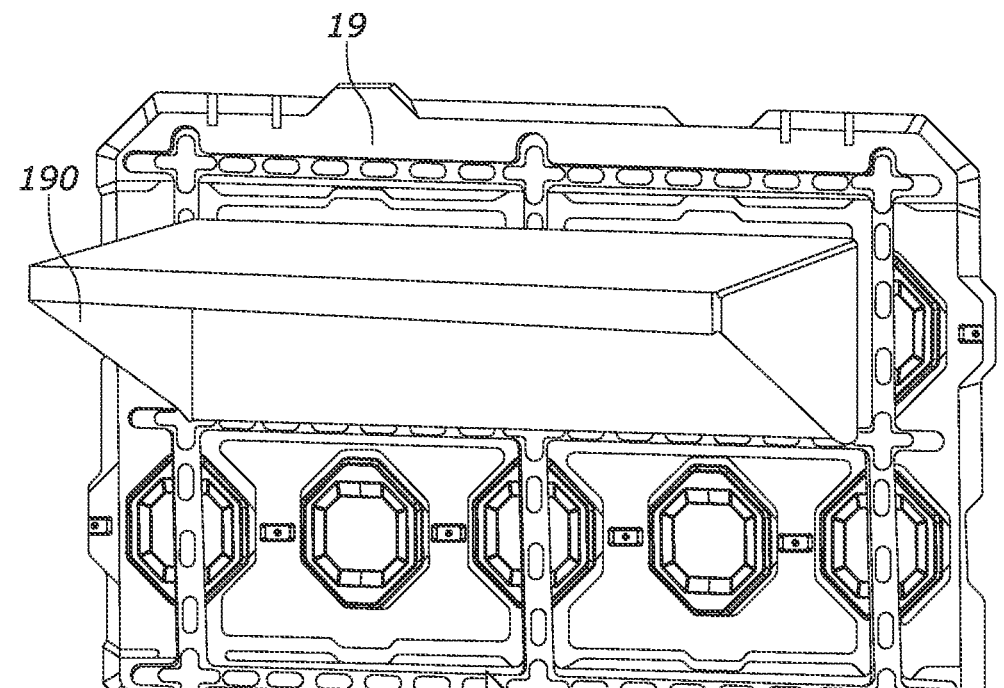
FIG. 14 is a perspective view of a single panel of FIG. 9 shown supporting a shelf.

FIGS. 12-14 illustrate a panel 19 supporting a shelf 190. In FIG. 12, multiple panels 18' engage each other through respective male and female mating features 162, 166, and shelves 190 are supported by either one or multiple panels 18'. That is, one of the shelves 190 can be supported across multiple panels 18'. In FIGS. 13 and 14, a single shelf 190 is supported on a single panel 19. Each shelf 190 can be mounted on either a rail 15 or a panel 19.

Figure 15:
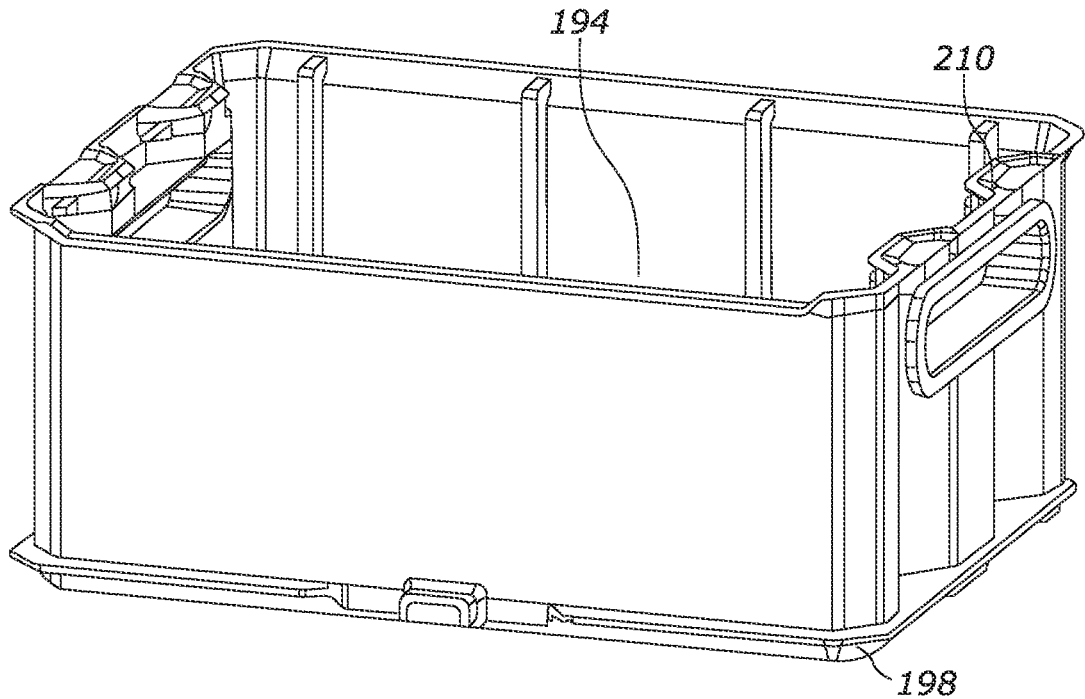
FIG. 15 is a front perspective view of a crate for use with a wall organization system.
Figure 16:
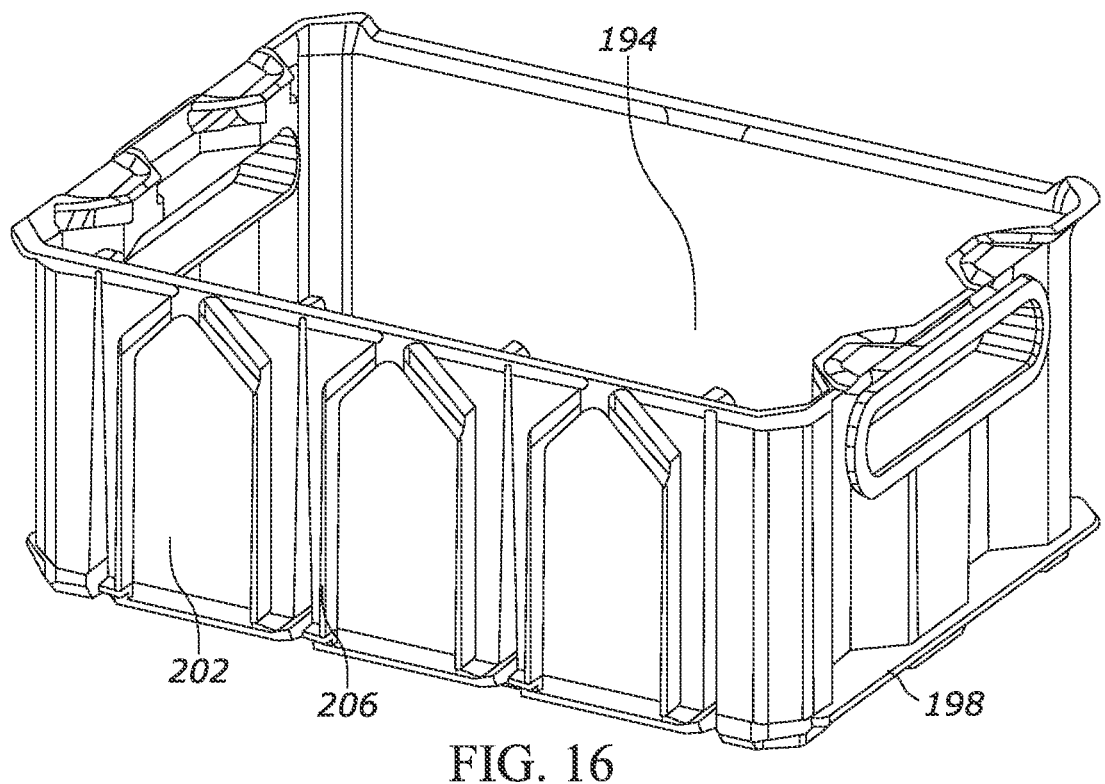
FIG. 16 is a rear perspective view of the crate in FIG. 15.
Figure 17:
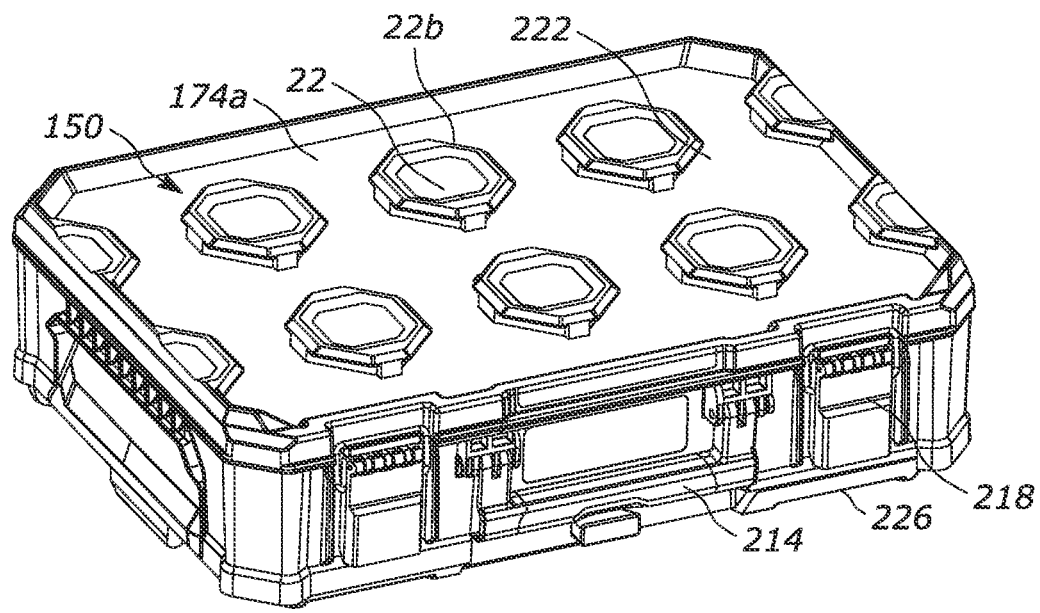
FIG. 17 is a perspective view of a first tool box for use with a wall organization system.
Figure 18:
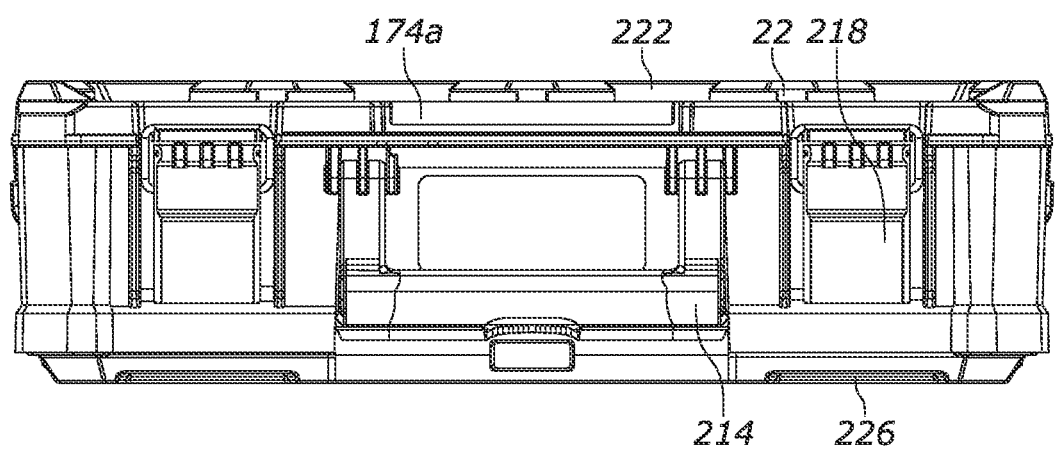
FIG. 18 is a front view of the first tool box of FIG. 17.
Figure 19:
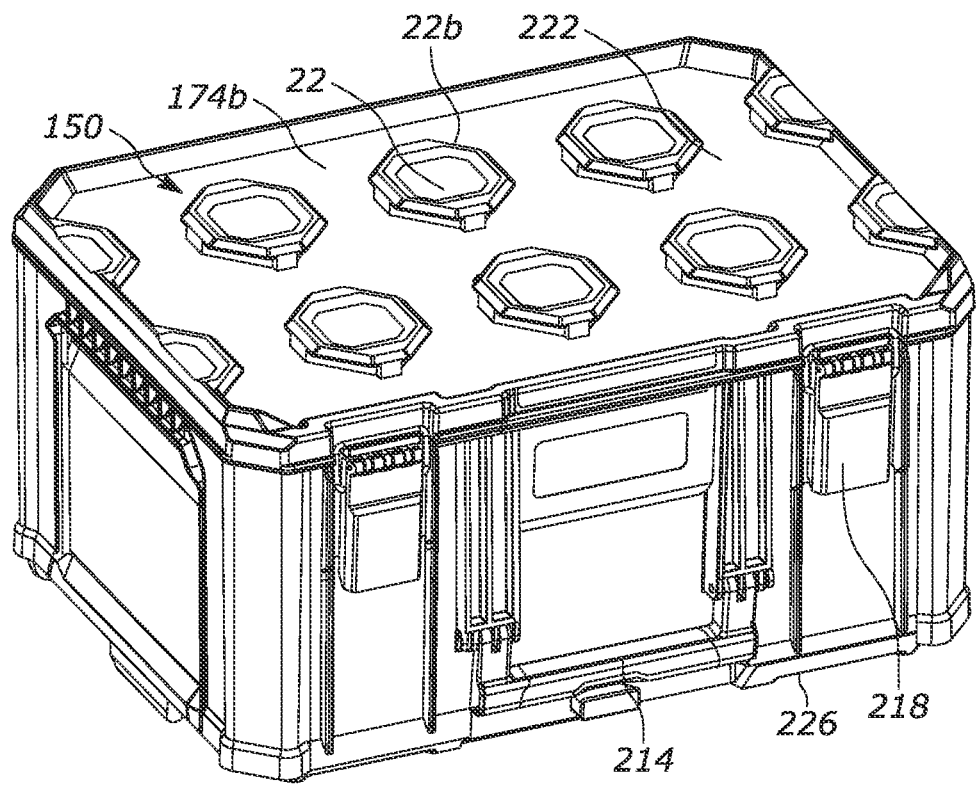
FIG. 19 is a perspective view of a second tool box for use with a wall organization system.
Figure 20:
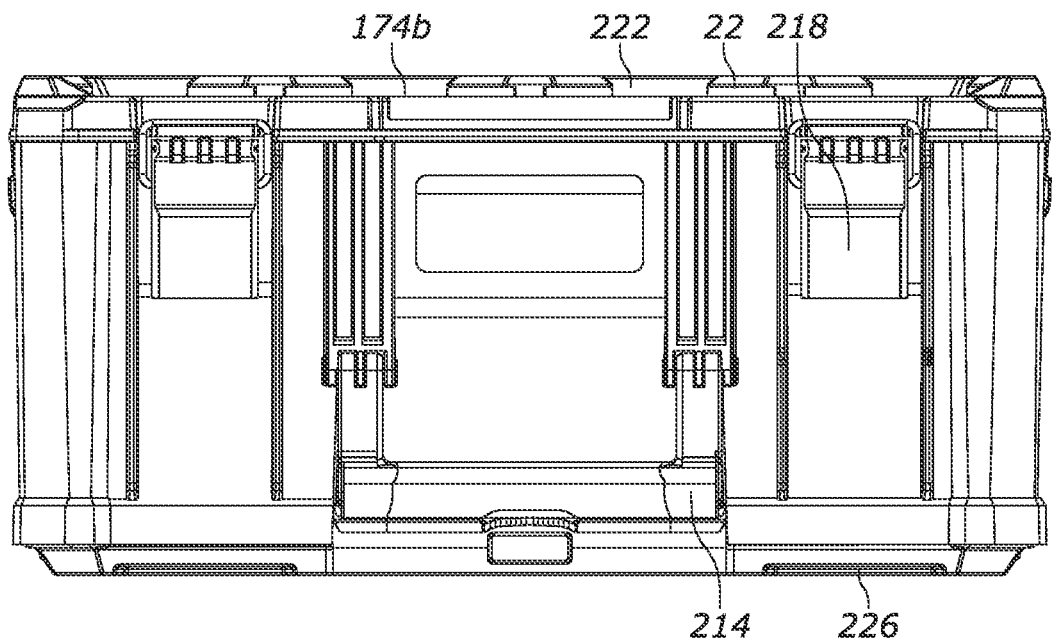
FIG. 20 is a front view of the second tool box of FIG. 19.

FIGS. 15 and 16 illustrate a crate 194. The crate 194 includes a base panel 198 and a rear surface 202 including hooks 206 which are configured to engage cleats 22 of either a rail 15 or a panel 19. The base panel 198 may be configured to engage a top surface 210 of another crate 194 for stacking multiple crates 194. The base panel 198 may also be configured to engage the hand truck 170 for transporting between the wall organization system 11 and a worksite. The base panel 198 may engage cleats 22 of the tool boxes 174a, 174b, 174c.

FIGS. 17-20 illustrate the tool boxes 174a and 174b in detail. Each tool box 174a, 174b includes a handle 214, a hinge 218, a top surface 222, and a bottom surface 226. Each tool box 174a, 174b includes cleats 22 positioned on the top surface 222 in an array 150 similar to the panel 19. The hinge 218 is operable to open and close to permit or restrict access to a void defined by the tool box 174a, 174b. The top surface 222 of one tool box 174a is operable to engage a bottom surface 226 of another tool box 174a, 174b, the rail 15, the panel 19, or the hand truck 170. FIG. 7 illustrates the tool boxes 174a, 174b, and a tool box 174c. The tool box 174c includes each of the features of the tool boxes 174a, 174b. The tool boxes 174a, 174b, 174c may be of different sizes to accommodate different objects 30 therein.

Figure 21:
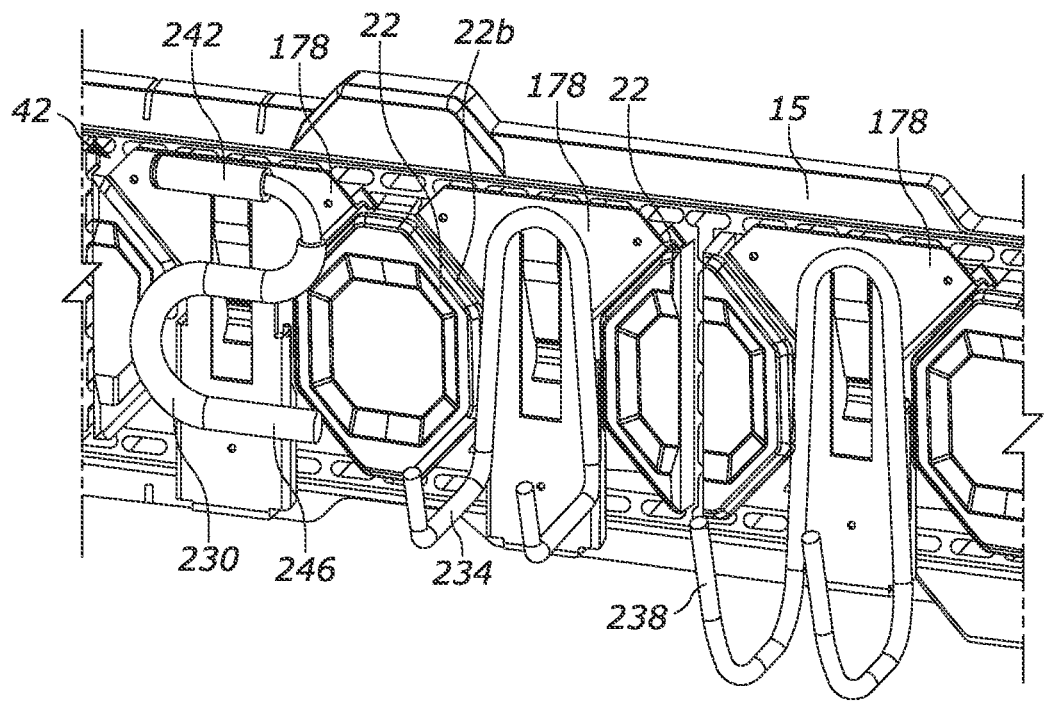
FIG. 21 is a perspective view of an S-hook, a first generic hook, and a second generic hook each supported to a rail via a mounting bracket.

FIGS. 21-31 illustrate various hanging attachments 42 each including at least one mounting bracket 178 and configured to support at least one object 30. The mounting bracket 178 includes hooks 180 (FIG. 11) as described above, which engage cleats 22 to support the mounting bracket 178 on a rail 15 or panel 19. FIG. 21 illustrates an S-hook 230, a first U-hook 234, and a second U-hook 238. The S-hook 230 is rotatably attached to the mounting bracket 178 at a first end 242, with a second end 246 of the S-hook 230 being rotatable away from the rail 15 about the first end 242. In the illustrated embodiment, the first U-hook 234 and the second U-hook 238 each include a pair of elongated supports having upstanding ends. The first U-hook 234 and the second U-hook 238 have different sizes and shapes.

Figure 22:
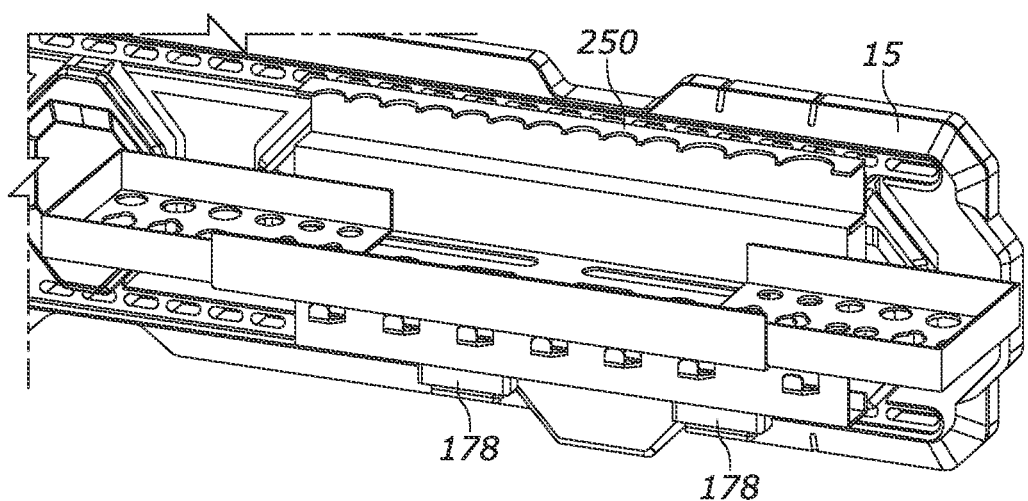
FIG. 22 is a perspective view of a first hand tool organizer supported on a rail via a mounting bracket
Figure 25:
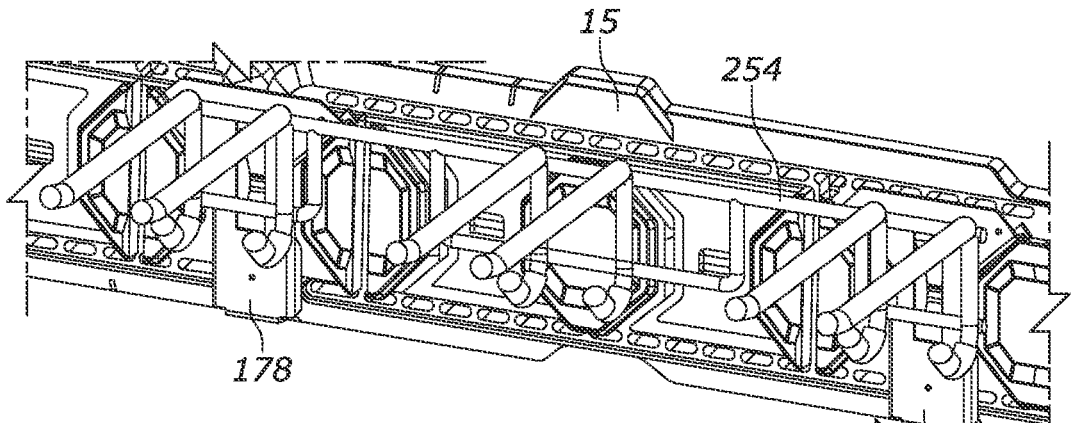
FIG. 25 is a perspective view of a second hand tool organizer supported on a rail a mounting bracket.

The mounting brackets 178 can support various other hanging attachments 42. FIGS. 22 and 25 illustrate a first hand tool organizer 250 and a second hand tool organizer 254, respectively. Each hand tool organizer 250, 254 functions as a hanging attachment 42 for supporting hand tools on a rail 15 or panel 19 via the mounting bracket 178. In the illustrated embodiment, the organizers 250, 254 are supported by multiple mounting brackets 178.

Figure 23:
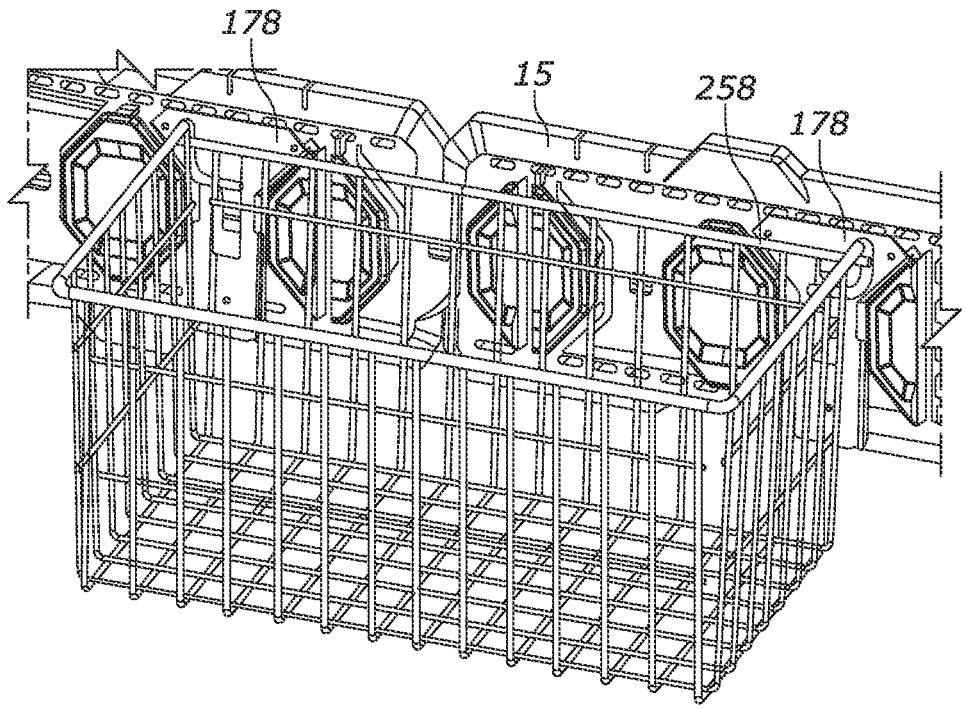
FIG. 23 is a perspective view of a wire basket supported on a rail via a mounting bracket.
Figure 24:
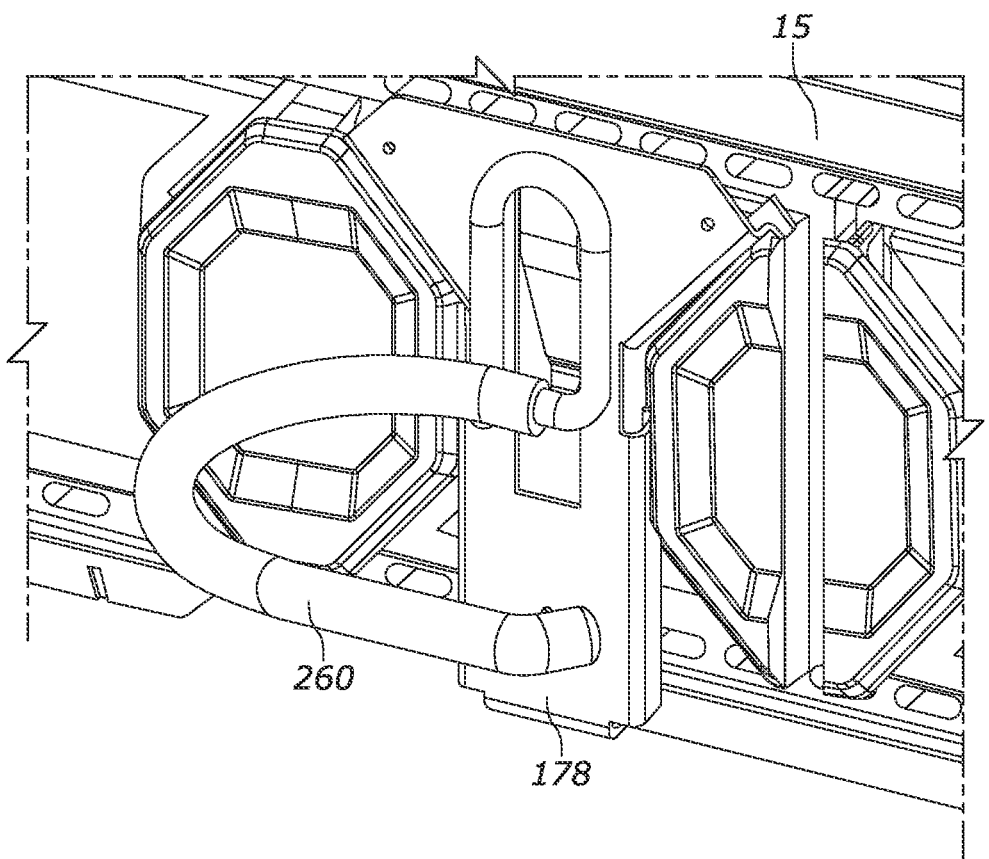
FIG. 24 is a perspective view of a bicycle hook supported on a rail supported via a mounting bracket.
Figure 26:
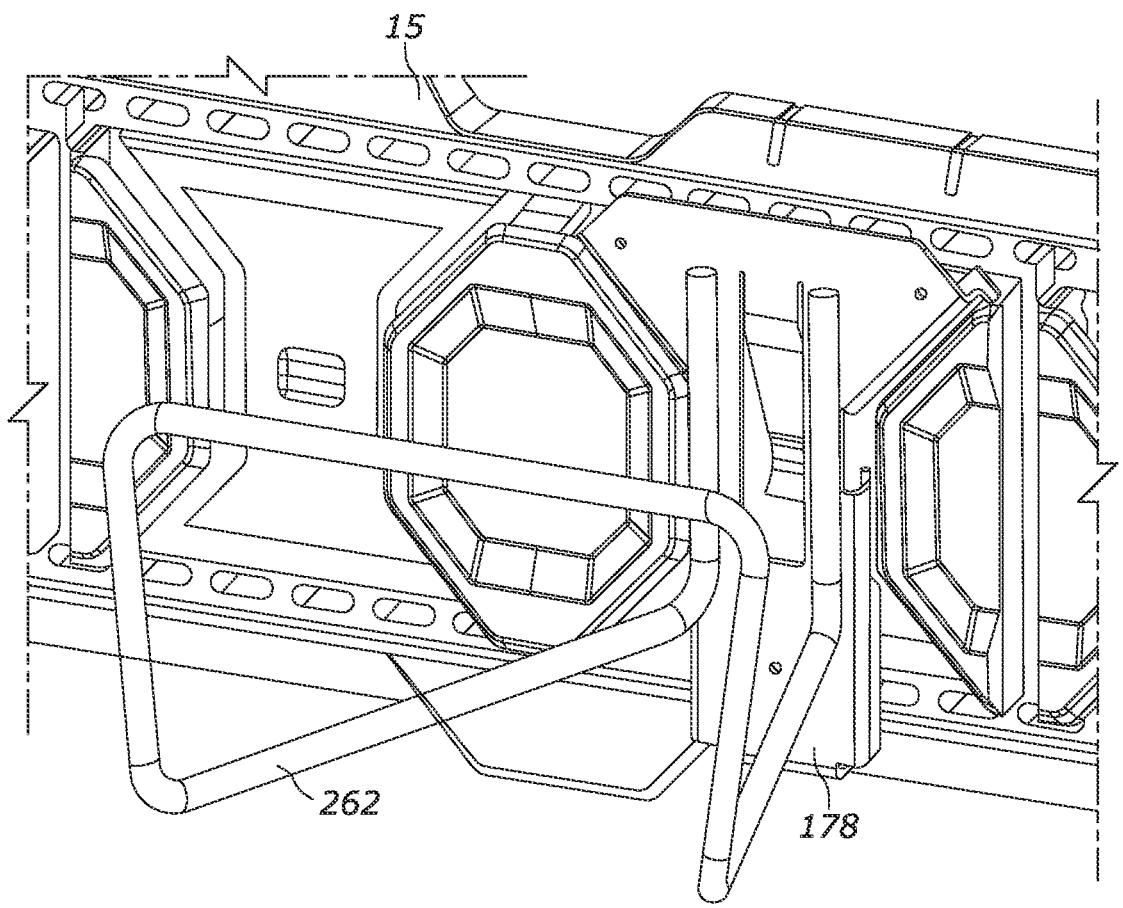
FIG. 26 is a perspective view of a third generic hook supported on a rail via a mounting bracket.
Figure 27:
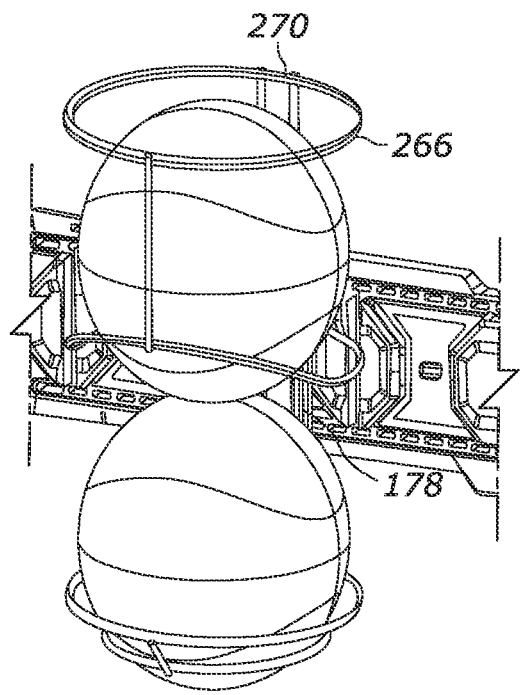
FIG. 27 is a perspective view of a sporting good holder supported on a rail via a mounting bracket.

FIG. 23 illustrates a wire basket 258. FIG. 24 illustrates a bicycle hook 260. The bicycle hook 260 is further illustrated in FIG. 7 with a bicycle (i.e., bicycle object 30) mounted thereon. FIG. 26 illustrates a third U-hook 262. In the illustrated embodiment, the U-generic hook 262 includes a pair of upstanding ends that are connected together. FIG. 27 illustrates a sporting good holder 266. The sporting good holder 266 may include a wireframe 270 configured to receive a ball.

Figure 28:
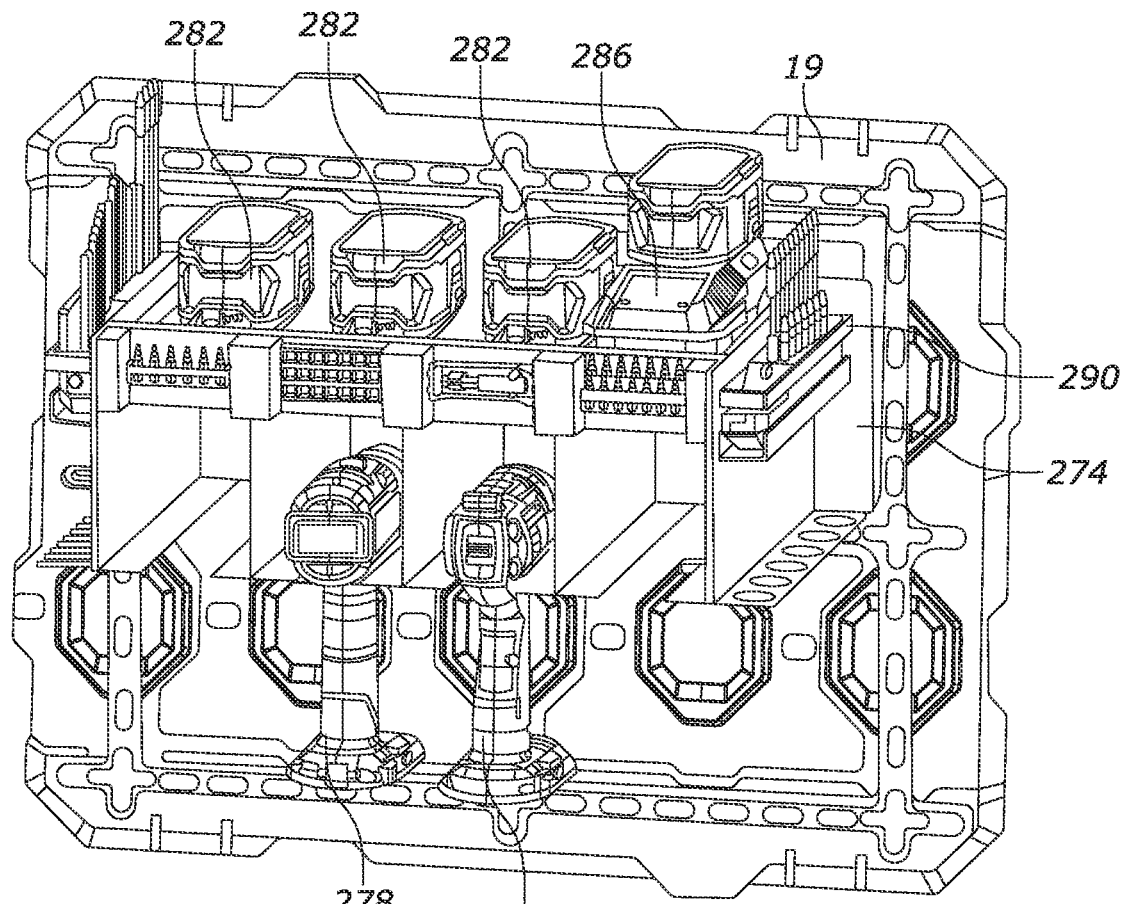
FIG. 28 is a perspective view of a drill driver holder supported on a panel via a mounting bracket.

FIG. 28 illustrates a driver holder 274. The driver holder 274 is configured to optionally support at least one drill or driver 278, at least one battery 282, and at least one battery charger 286. The drill driver holder 274 may also include an auxiliary support structure 290 configured to optionally support other objects 30 such as accessories (e.g., drill bits) and other hand tools (e.g., screwdrivers).

Figure 29:
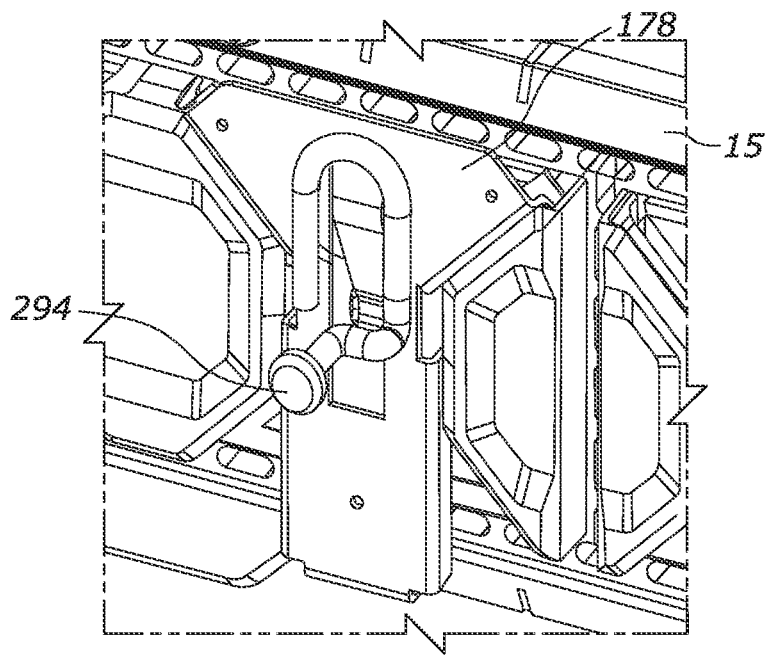
FIG. 29 is a perspective view of an outdoor power tool holder supported on a rail via a mounting bracket.
Figure 29A:
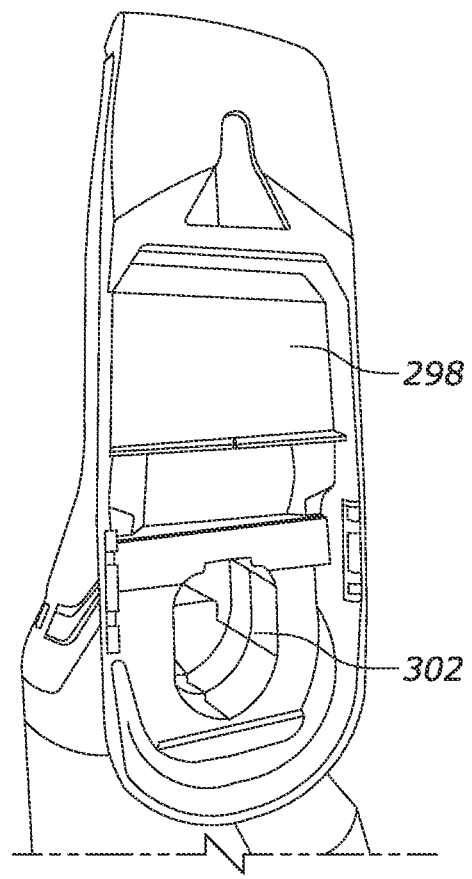
FIG. 29A is a rear perspective view of an outdoor power tool known in the prior art.
Figure 30:
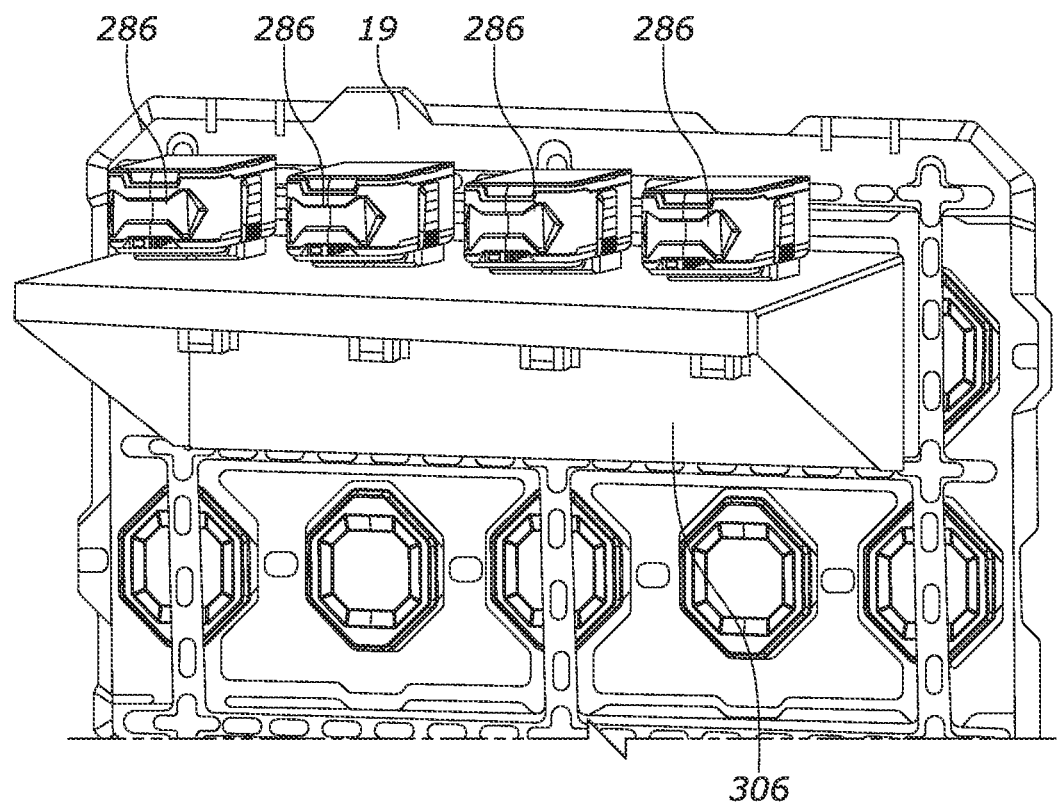
FIG. 30 is a perspective view of a battery holder supported on a panel via a mounting bracket.
Figure 31:
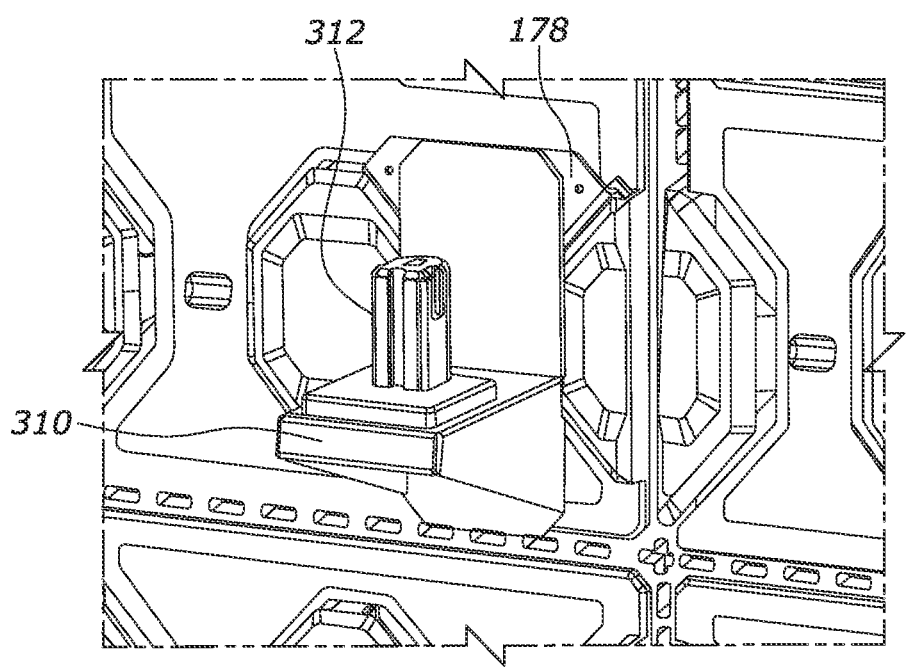
FIG. 31 is a perspective view of a power tool holder supported on a panel via a mounting bracket.

FIG. 29 illustrates a tool interface 294. The tool interface 294 is supported by a mounting bracket 178. The tool interface 294 may engage a tool, such as an outdoor power tool 298 as shown in FIG. 29A. In the illustrated embodiment, the tool interface 294 provides support means for engaging a receptacle 302 of an outdoor power tool 298. In the illustrated embodiment, the receptacle 302 may also be configured to receive a battery 282 to power the outdoor power tool 298. The outdoor power tool 298 may be, without limitation, a blower (such as the blower 122), a chain saw, a string trimmer (such as the string trimmer 114), or the like. FIG. 30 illustrates a battery holder 306 configured to support at least one battery 282. FIG. 31 illustrates a tool holder 310 configured to support a tool. In the illustrated embodiment, the tool holder 310 includes a tool interface 312 operable to engage a receptacle of a tool similar to the tool interface 294. In some embodiments, the receptacle of the tool may be a battery receptacle of the tool.

Figure 32:
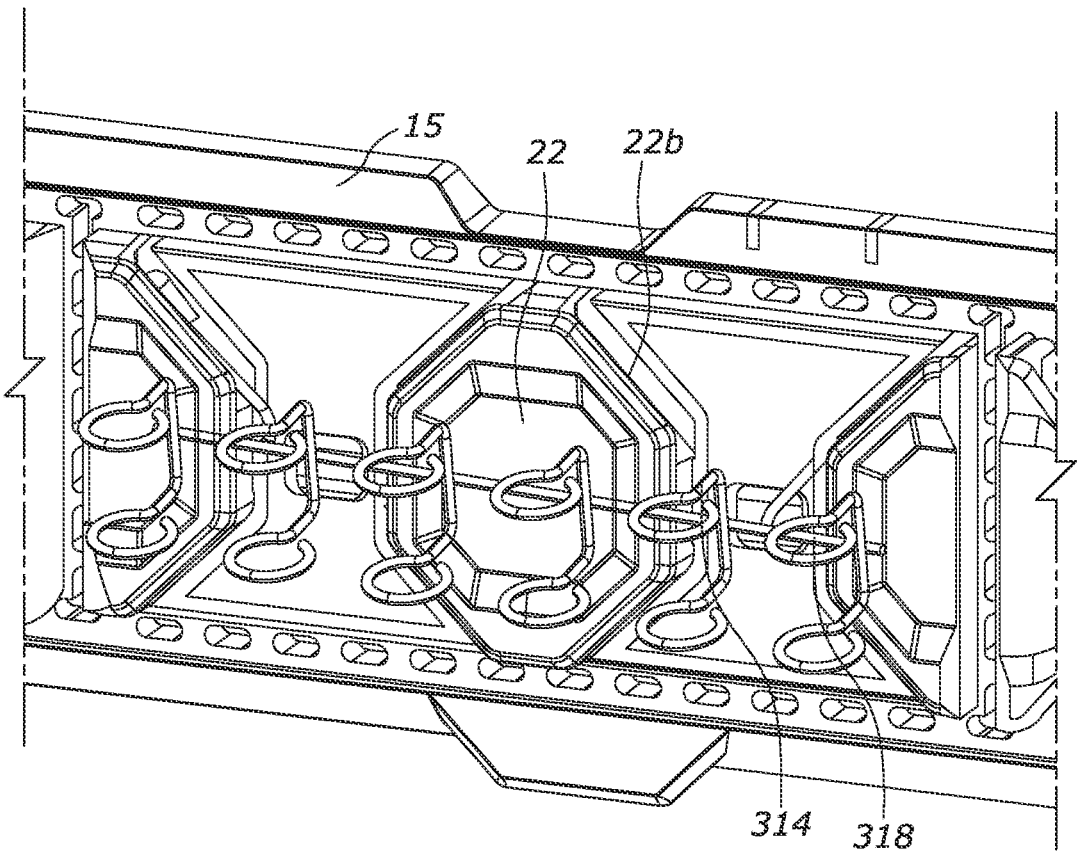
FIG. 32 is a perspective view of a third hand tool organizer supported on a rail via a cleat.
Figure 33:
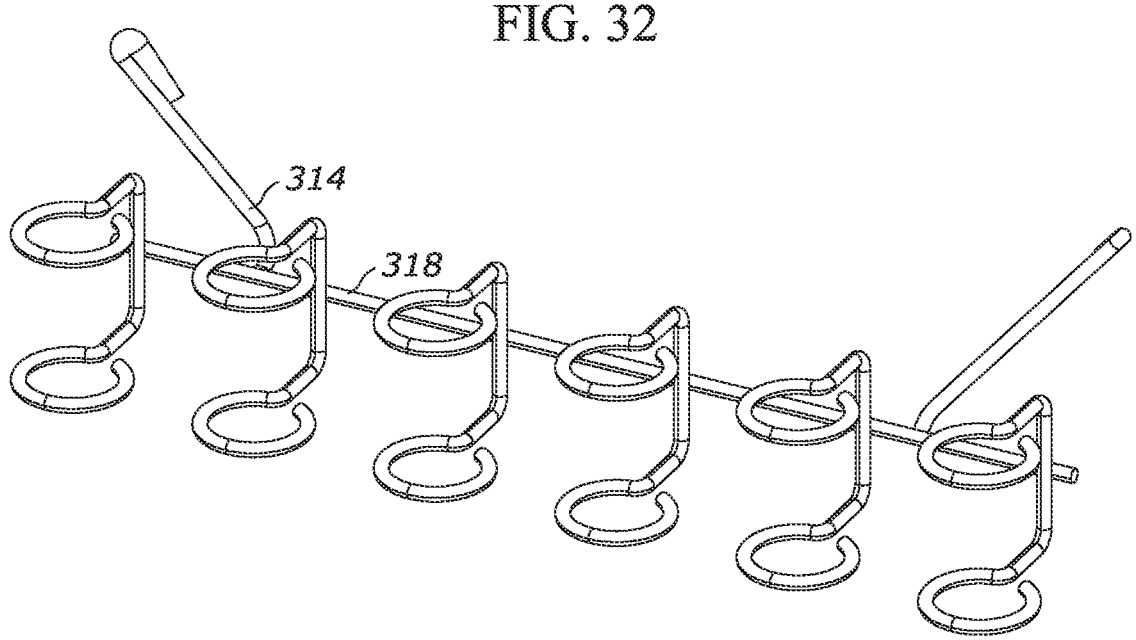
FIG. 33 is a perspective view of the third hand tool organizer of FIG. 32.

Other hanging attachments 42 are available which do not include a mounting bracket 178. For example, a third hand tool organizer 314 includes a wireframe 318 which directly engages one or more cleat(s) 22 to support the third hand tool organizer 314 on a rail 15 or a panel 19. The third hand tool organizer 314 is illustrated in FIGS. 32-33.

Figure 34:
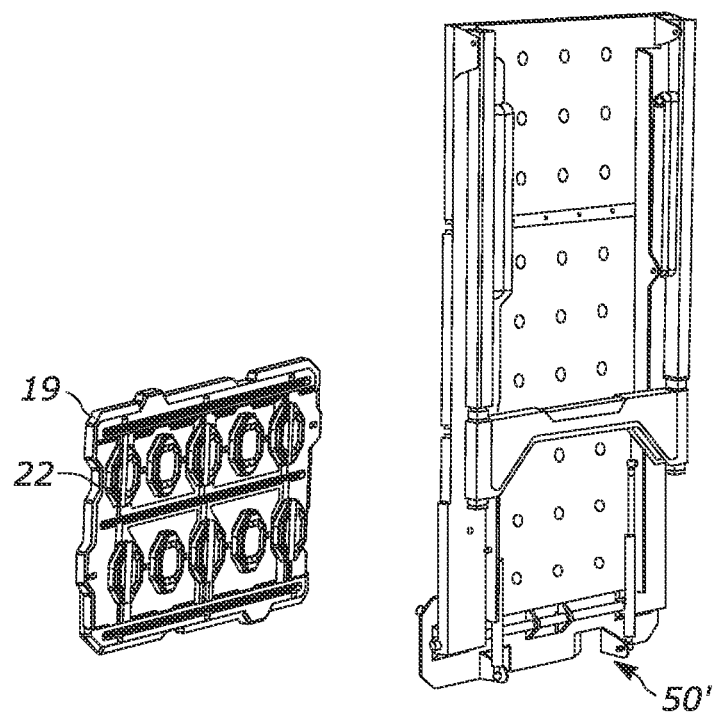
FIG. 34 is a perspective view of a workbench separated from a panel.
Figure 35:
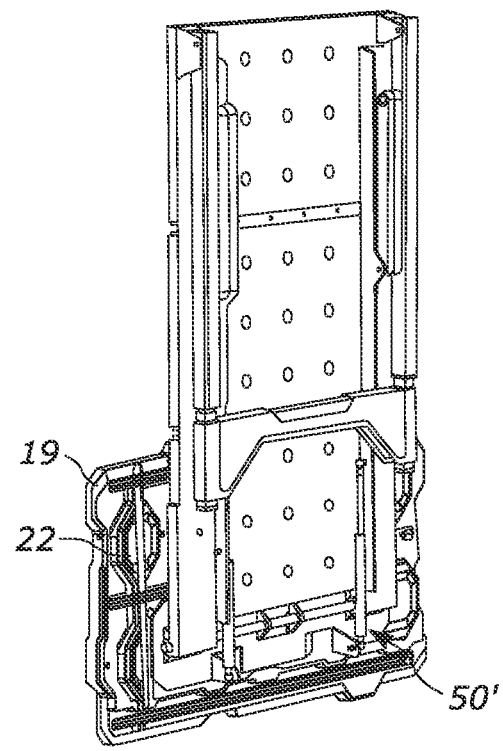
FIG. 35 is a perspective view of the workbench of FIG. 34 attached to the panel and in a retracted position.
Figure 36:
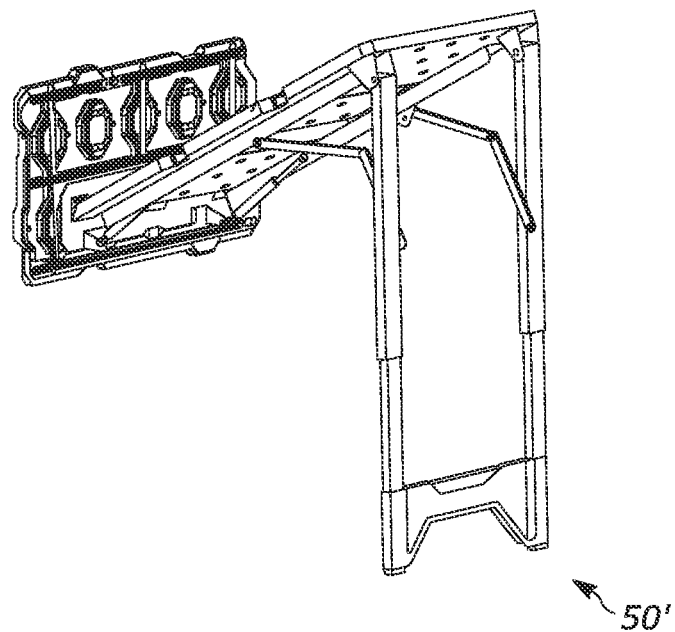
FIG. 36 is a perspective view of the workbench of FIG. 34 attached to the panel and in a partially extended position.
Figure 37:
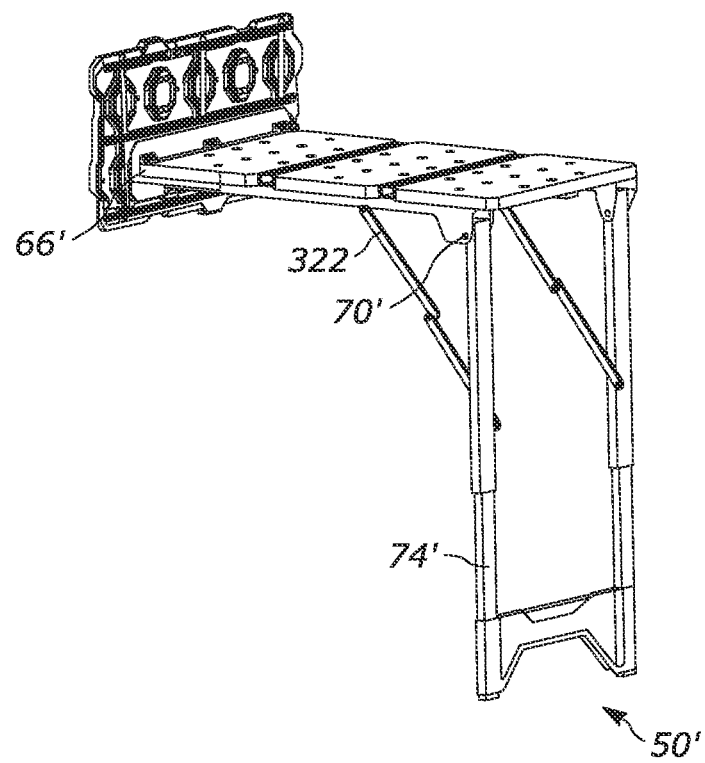
FIG. 37 is a perspective view of the workbench of FIG. 34 attached to the panel and in an extended position.

FIGS. 34-37 illustrate an alternate workbench 50'. The alternate workbench 50' is similar to the workbench 50 and, as shown in FIGS. 34-35, is removably supported on either a rail 15 or a panel 19. FIG. 35 illustrates the workbench 50' attached to the panel 19 in a retracted position in which the workbench 50' is parallel to the wall W. FIGS. 36-37 illustrate movement of the workbench 50' between the retracted position and an extended position in which the workbench 50' extends perpendicularly from the wall W. The workbench 50' has a first hinge 66' between the workbench 50' and the panel 19 and a similar second hinge 70' between a distal end of the workbench 50' and a leg 74'. The workbench 50' further includes at least one pivotable support beam 322 extending between the workbench 50' and the leg 74'.

FIGS. 38-39 illustrate a combination hand truck and workbench assembly 50" that is supported for movement by wheels. As shown in FIGS. 38-39, the hand truck 170 may also support multiple tool boxes 174a. The second alternate workbench 50" may also include slots 326 configured to receive clamps 330 or other objects 30.

FIGS. 38A-46 illustrate another alternate workbench 50". The alternate workbench 50" is similar to the workbench 50 and the workbench 50'. Features described with respect to the workbench 50 and the workbench 50' may be equally applicable to the alternate workbench 50". Some of the features in the workbench 50 and the workbench 50' are within the workbench 50" and are denoted with the reference numeral and double apostrophes (").

Figure 38B:
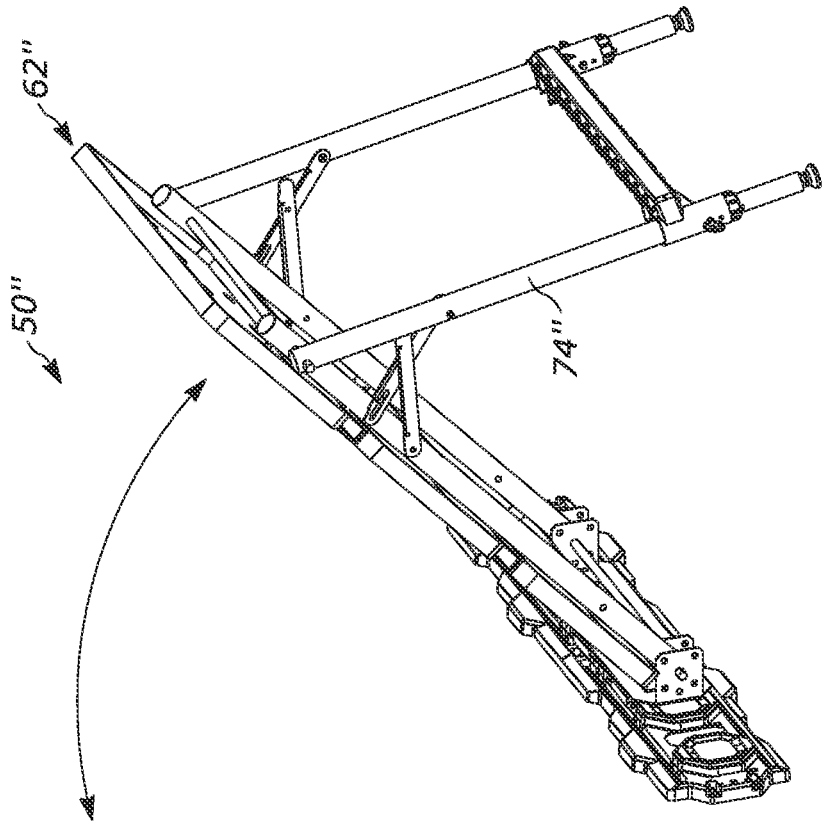
FIG. 38B is a perspective view of the alternate workbench of FIG. 38A in an intermediate position between the upper storage position and a work position.
Figure 38A:
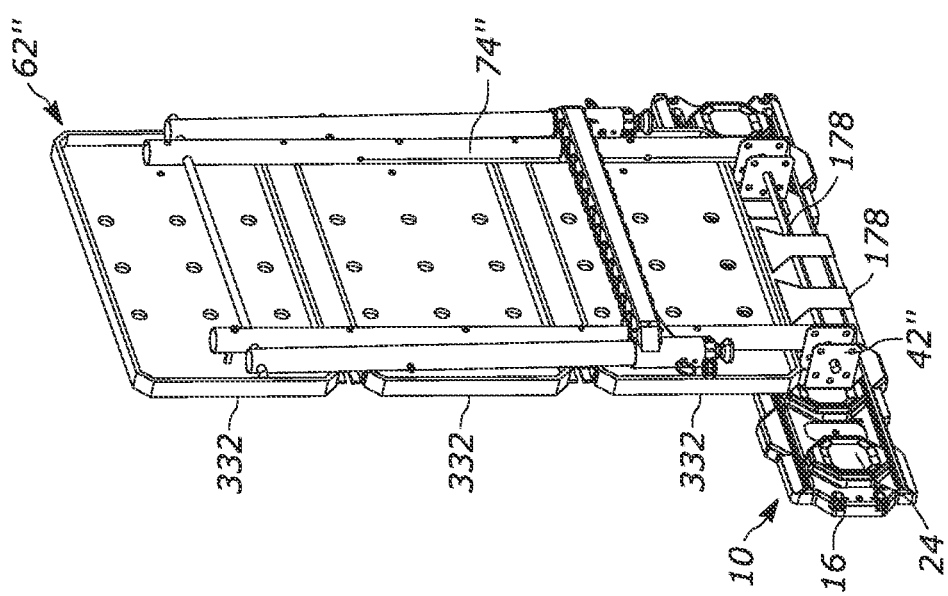
FIG. 38A is a perspective view of an alternate workbench in an upper storage position.
Figure 38C:
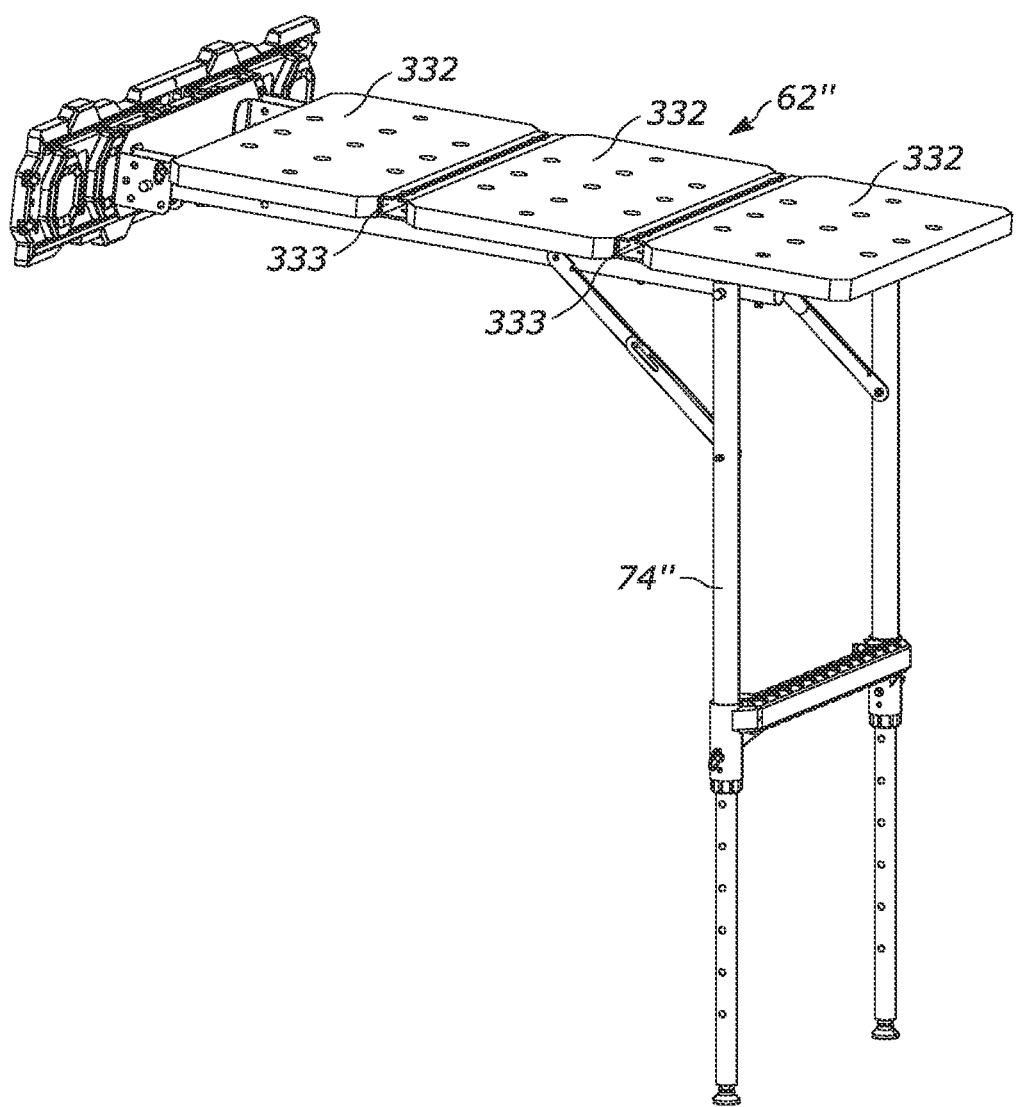
FIG. 38C is a perspective view of the alternate workbench of FIG. 38A in a work position.

As illustrated in at least FIG. 38C, the movable portion 62" of the workbench 50" includes three top portions 332. The top portions 332 are configured to engage clamps 330 or other objects 30. Channels 333 are positioned between each of the top portions 332. The channels 333 are shaped to define T-shaped slots for engaging clamps 330 or other objects 30. The channels 333 may be otherwise shaped.

As shown in FIGS. 38A-38C, the workbench 50" is supportable on the rail 14 of the wall organization system 10 via the hanging attachment 42". The hanging attachment 42" includes at least one mounting bracket 178 configured to engage at least a portion of one cleat 22 on the rail 16 to support the workbench 50". The workbench 50" further comprises legs 74" similar to the legs 74' of the workbench 50' and a movable portion 62" (i.e., a table portion 62") similar to the movable portion of the workbench 50. FIG. 38C illustrates the workbench 50" in a work position in which the movable portion 62" is perpendicular relative to the wall W and supported on the ground G by the legs 74". To move the workbench 50" to an upper storage position illustrated in FIG. 38A, the legs 74" are collapsed, and an upward force is applied to the movable portion 62". FIG. 38B illustrates the workbench 50" in an intermediate position between the upper storage position and the work position. In the upper storage position, the work surface of the movable portion 62" which faces away from the ground G in the work position faces towards the wall W in the upper storage position. The opposite process is carried out to move the workbench 50" from the upper storage position to the work position.

Figure 39B:
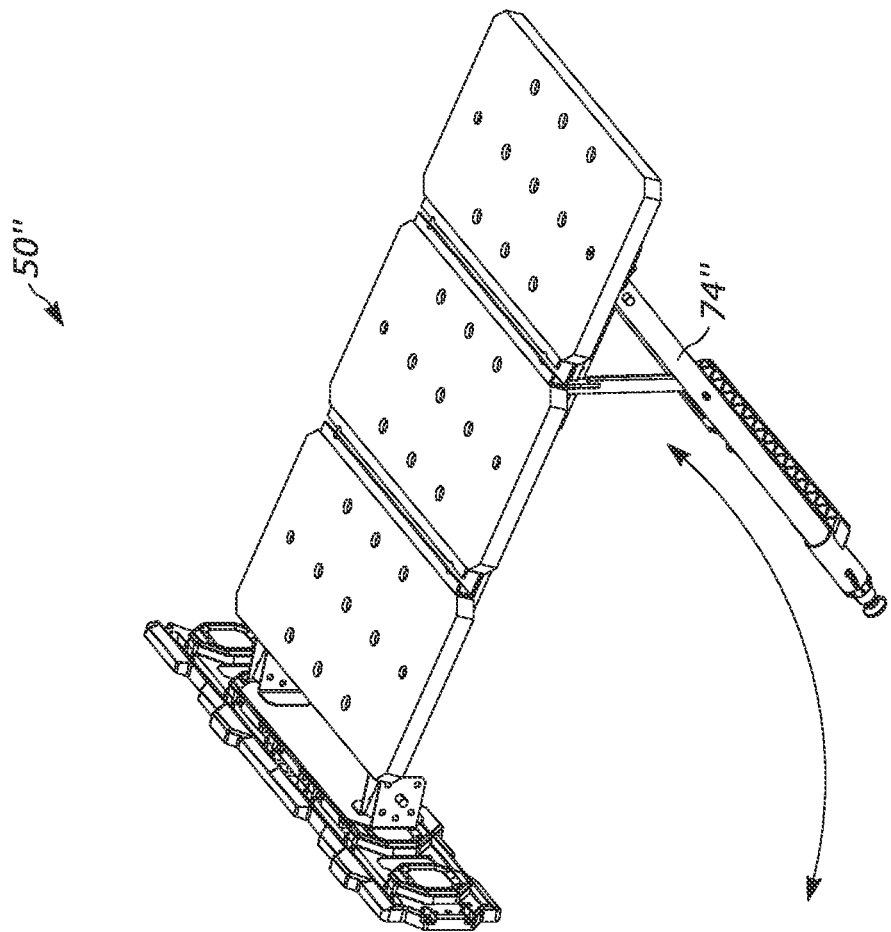
FIG. 39B is a perspective view of the alternate workbench of FIG. 38A in an intermediate position between the lower storage position and the work position.
Figure 39A:
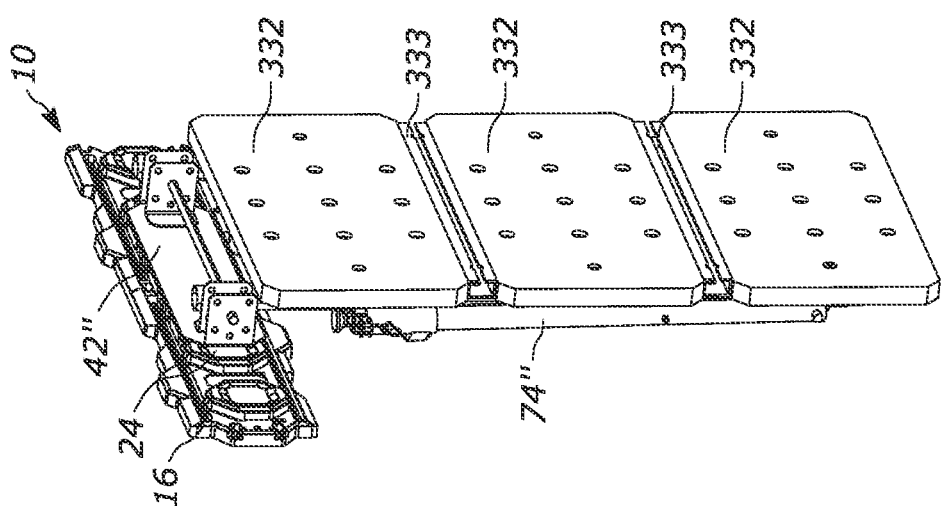
FIG. 39A is a perspective view of the alternate workbench of FIG. 38A in a lower storage position.
Figure 39C:
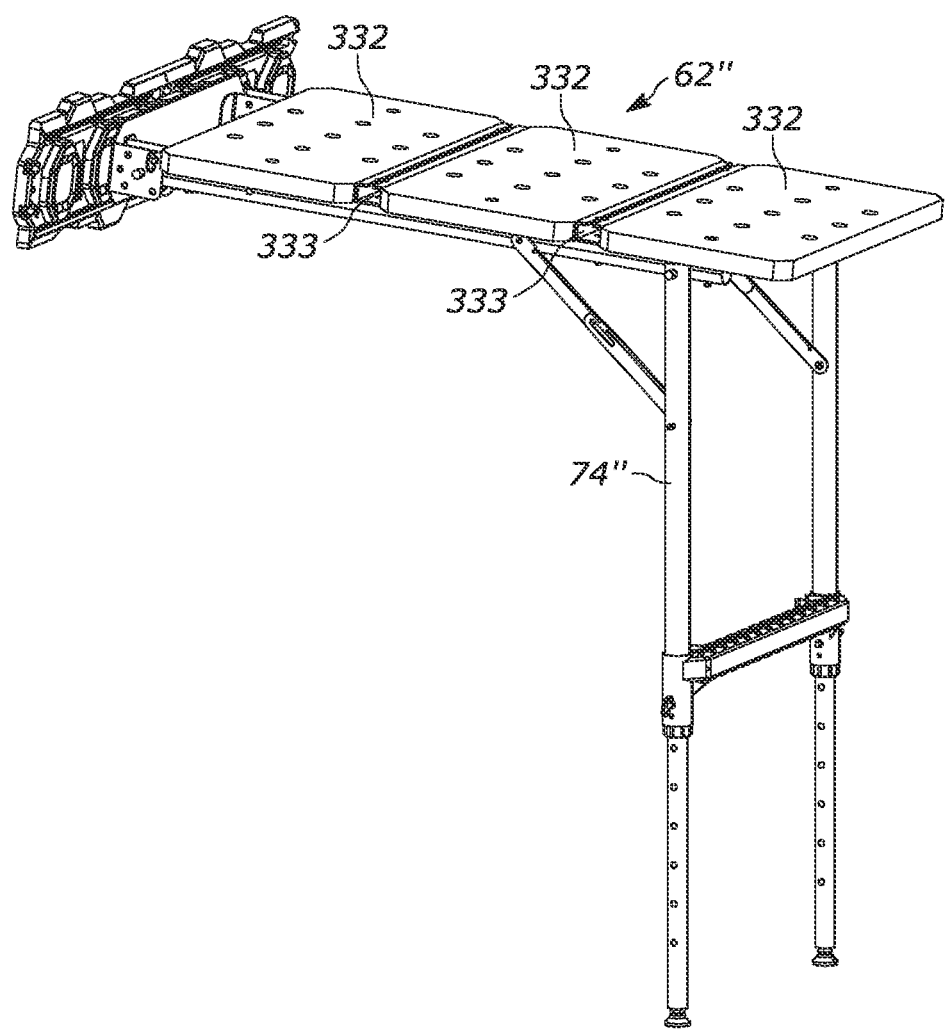
FIG. 39C is a perspective view of the alternate workbench of FIG. 38A in a work position.

As shown in FIGS. 39A-39C, the workbench 50" is also movable between the work position and a lower storage position. To move the workbench 50" to the lower storage position illustrated in FIG. 39A, the legs 74" are collapsed, and a downward force is applied to the movable portion 62". FIG. 39B illustrates the workbench 50" in an intermediate position between the lower storage position and the work position. In the lower storage position, the work surface of the movable portion 62" which faces away from the ground G in the work position faces away from the wall W in the lower storage position. The opposite process is carried out to move the workbench 50" from the lower storage position to the work position.

Figure 42:
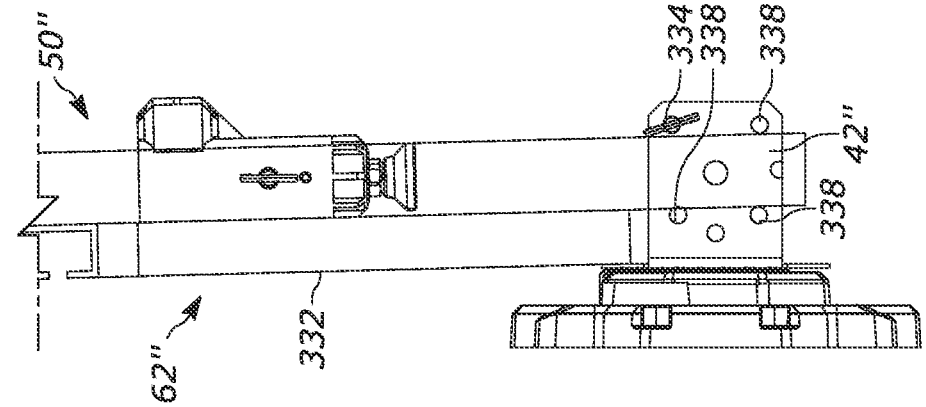
FIG. 42 is a side view of the alternate workbench of FIG. 38A with a pin inhibiting motion of the workbench away from the wall.
Figure 40:
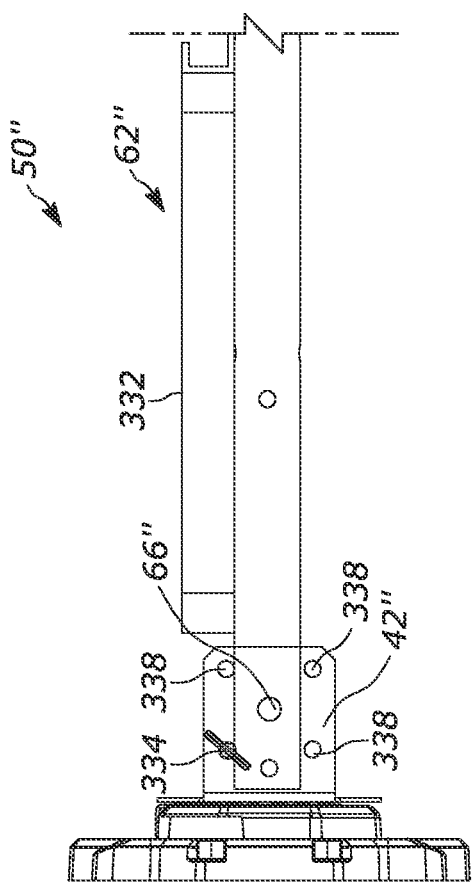
FIG. 40 is a side view of the alternate workbench of FIG. 38A with a pin inhibiting excess downward motion of the workbench.
Figure 41:
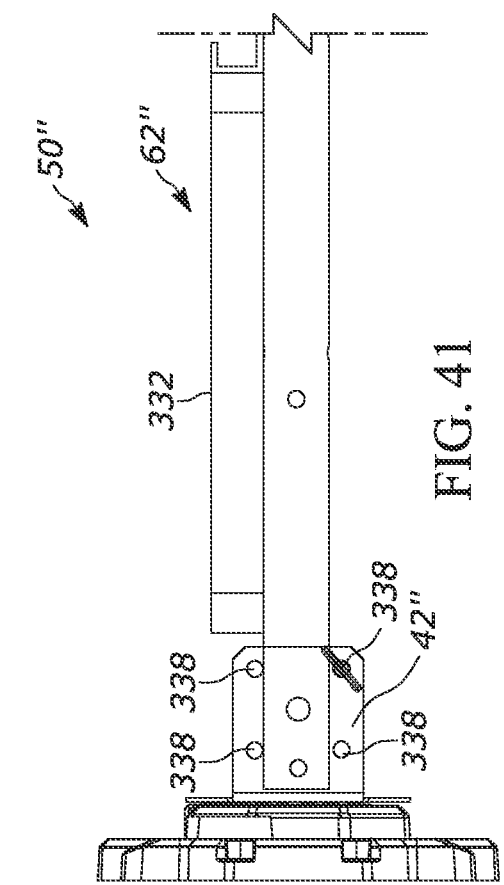
FIG. 41 is a side view of the alternate workbench of FIG. 38A with a pin inhibiting excess upward motion of the workbench.

FIGS. 40-42 illustrate a pin 334 engaging the hanging attachment 42", the pin 334 being configured to retain the movable portion 62" in one of the upper storage position (FIG. 42), the lower storage position (not shown), or the work position (FIGS. 40, 41). The first hinge 66" engages the movable portion 62" at a position centrally located relative to holes 338 of the hanging attachment 42". The holes 338 are configured as a rectangular array around the first hinge 66" when the hinge 66" is applied to the hanging attachment 42". With the pin 334 in the position of FIG. 40, the pin 334 inhibits excess downward motion of the movable portion 62" when the legs 74" support the movable portion 62" on the ground G. Conversely, with the pin 334 in the position of FIG. 41, the pin 334 inhibits excess upward motion of the movable portion 62" when the legs 74" support the movable portion 62" on the ground G. Finally, with the pin 334 in the position illustrated in FIG. 44, the pin 334 inhibits lateral motion of the movable portion 62" away from the wall W when stored in the upper storage position. The pin 334 may also engage a hole 338 to inhibit lateral motion of the movable portion 62" away from the wall W when stored in the lower storage position (not shown).

Figure 43:
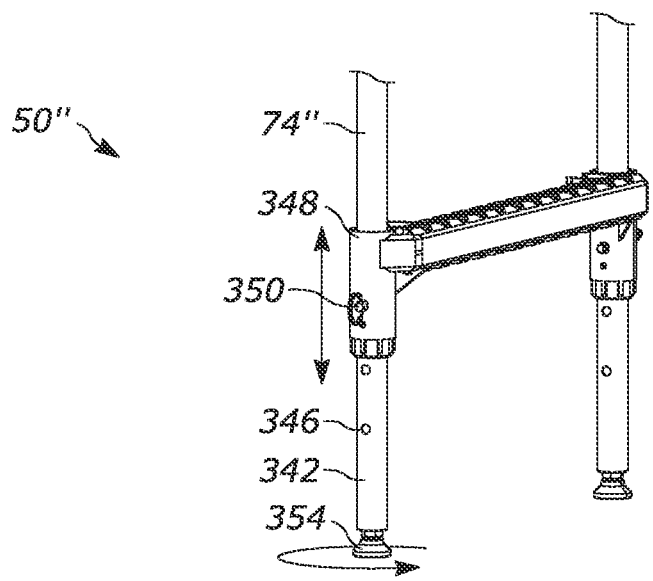
FIG. 43 is a perspective view of the alternate workbench of FIG. 38A illustrating the adjustability of the legs thereof.

FIG. 43 illustrates the legs 74" of the workbench 50" in detail. The legs 74" include telescopic portions 342 having holes 346 therein. The legs 74" further include fixed portion 348. The holes 346 correspond with various discrete heights of the movable portion 62" (i.e., the table) relative to the ground G. This provides a course adjustment of the height of the movable portion 62" relative to the ground G. A pin 350 secures the telescopic portion 342 to the fixed portion 348 to fix the telescopic portion 342 relative to the fixed portion

348. The ends of the legs 74", and more specifically, the telescopic portions 342 terminate with feet 354. The feet 354 are received by the telescopic portion 342 such that they are pivotably adjustable to provide a fine adjustment of the height of the movable portion 62" relative to the ground G.

Figure 44:
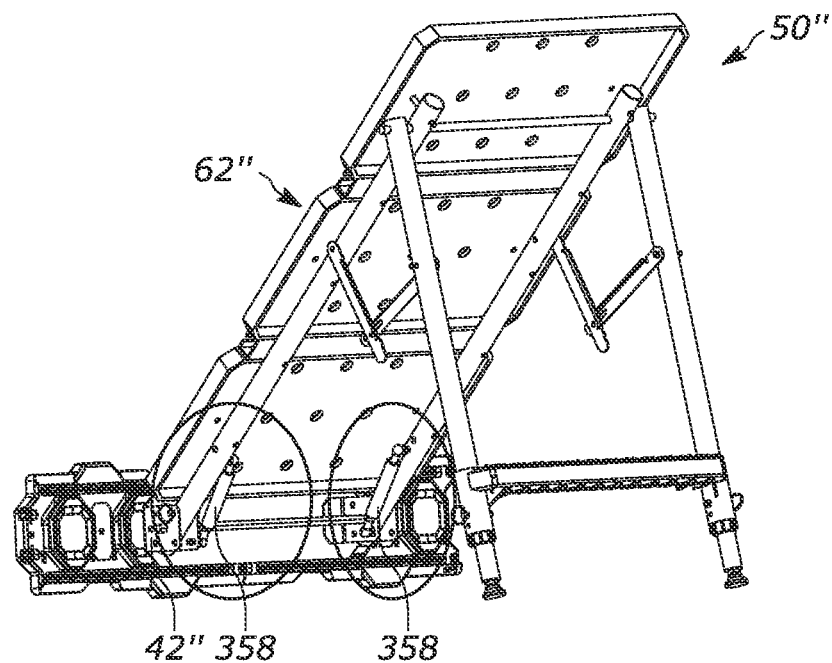
FIG. 44 is a bottom perspective view of the alternate workbench in an intermediate position as in FIG. 38B.

FIG. 44 illustrates a bottom perspective view of one embodiment of the alternate workbench 50". In this embodiment, the alternate workbench 50" includes spring dampers 356 between the hanging attachment 42" and the movable portion 62". The spring dampers 356 are configured to assist the user in folding out the movable portion 62" (i.e., moving from the upper storage position of FIG. 38A to the work position of FIGS. 38C and 39C).

Figure 45A:
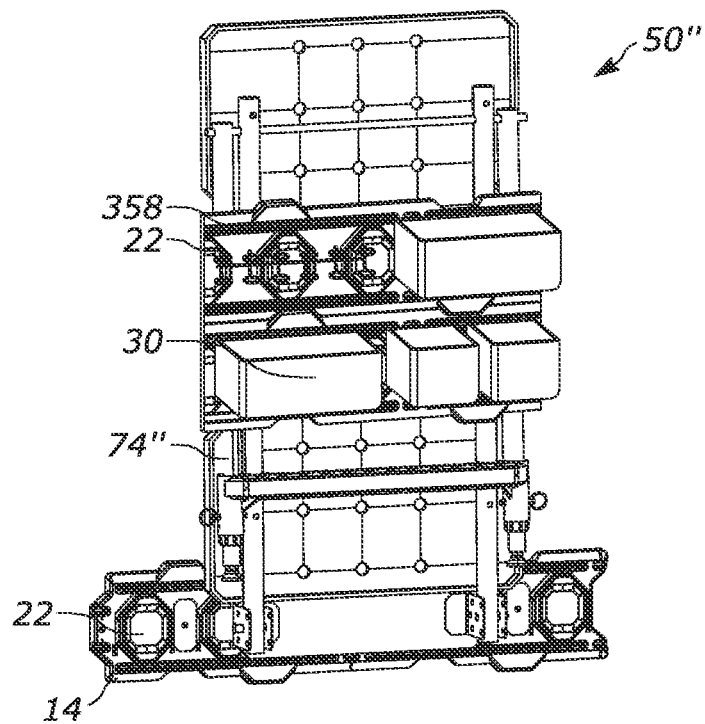
FIG. 45A is a perspective view of the alternate workbench of FIG. 38A including a storage support surface coupled to the legs.
Figure 45B:
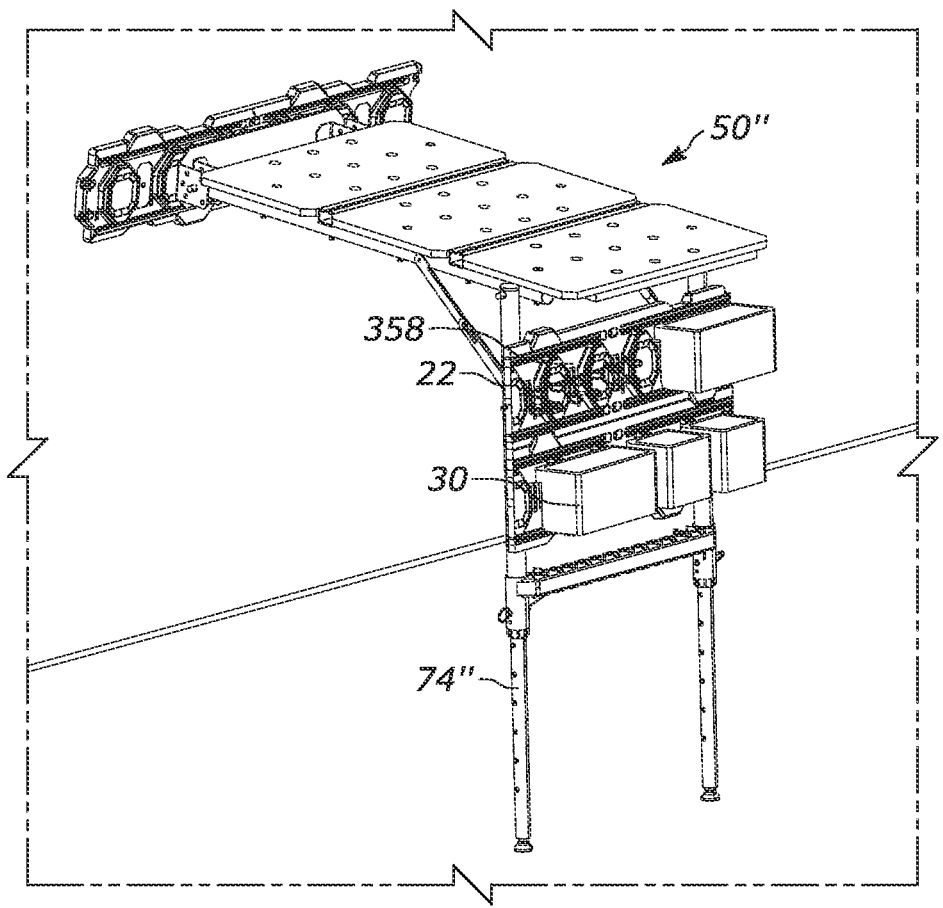
FIG. 45B is a perspective view of the alternate workbench of FIG. 38C including a storage support surface coupled to the legs.

FIGS. 45A and 45B illustrate perspective views of another embodiment of a workbench 50". In this embodiment, the workbench 50" includes a storage support interface 358 coupled to the legs 74". In the illustrated embodiment, the storage support interface 358 includes features (e.g., cleats 22) that function similar to the features on the rails 14 to engage correspondingly sized objects 30. As illustrated in FIGS. 45A and 45B, the storage support interface 358 is visible when the workbench 50" is in either the upper storage position or the use position.

Figure 46A:
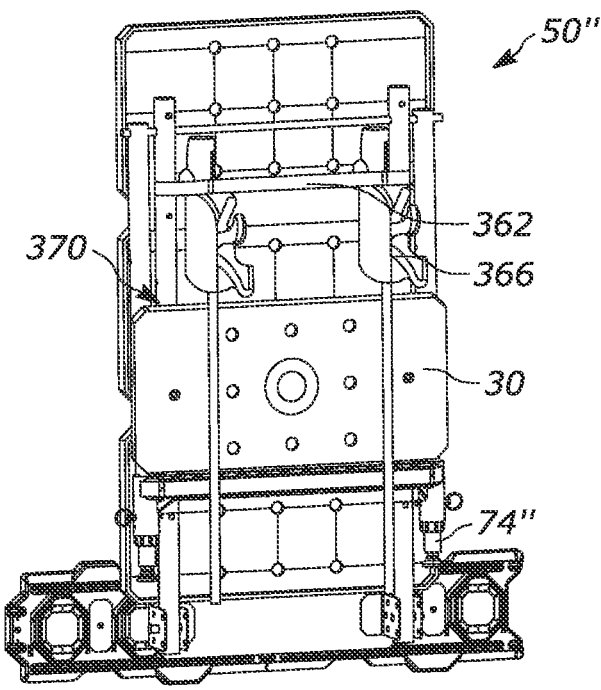
FIG. 46A is a perspective view of the alternate workbench of FIG. 38A including a crossbar and an additional storage interface.
Figure 46B:
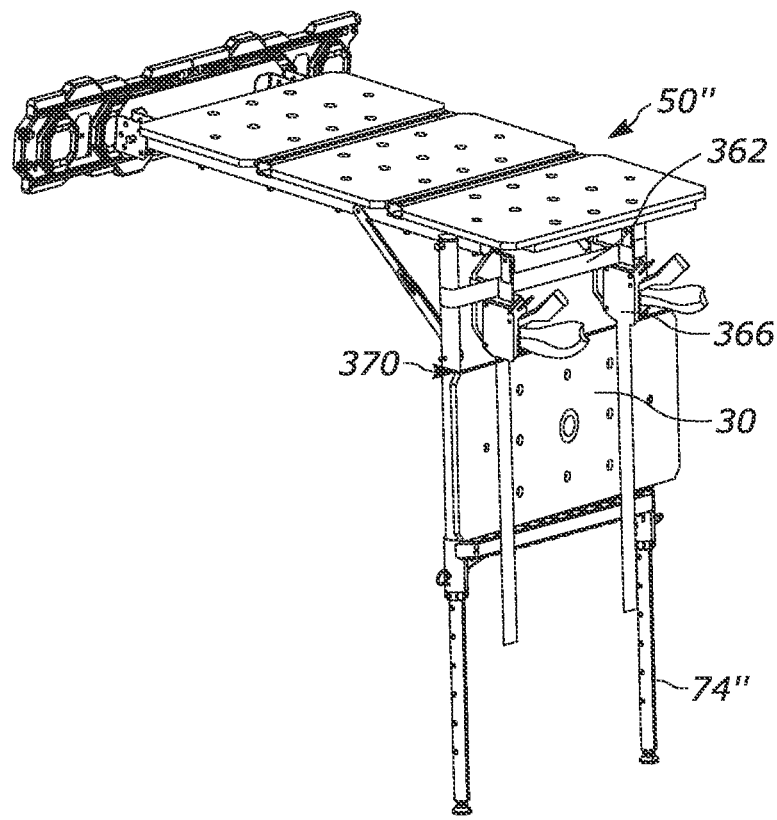
FIG. 46B is a perspective view of the alternate workbench of FIG. 38C including a crossbar and an additional storage interface.

FIGS. 46A and 46B illustrate perspective views of another embodiment of the alternate workbench 50". In this embodiment, the alternate workbench 50" includes a crossbar 362 extending between each of the legs 74". The crossbar 362 may be used to hang clamps 366 or another object 30 therefrom. Further, this embodiment of the alternate workbench 50" may optionally include an additional dedicated storage interface 370. The additional dedicated storage interface 370 may connect another object 30 (such as, without limitation, an extra table surface portion such as a router table) to the legs 74". As illustrated in FIGS. 46A and 46B, crossbar 362 and the storage interface 370 are visible when the workbench 50" is in either the upper storage position or the use position.

Figure 47A:
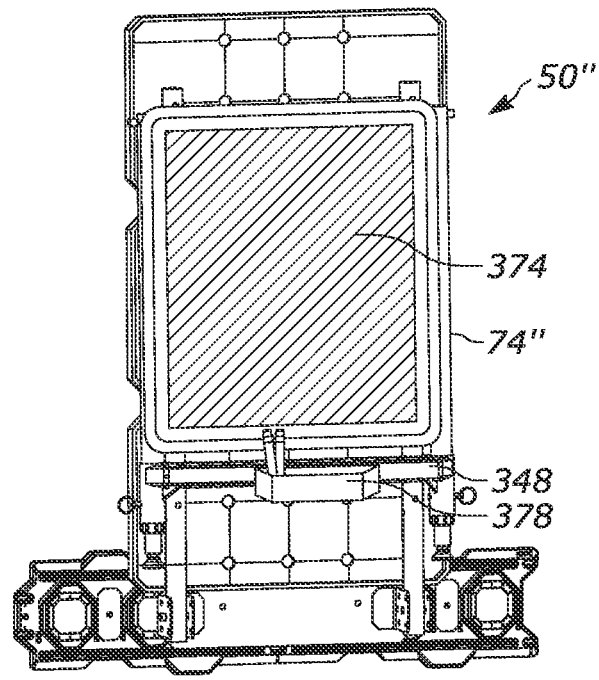
FIG. 47A is a perspective view of the alternate workbench of FIG. 38A including a marking board coupled to the legs.
Figure 47B:
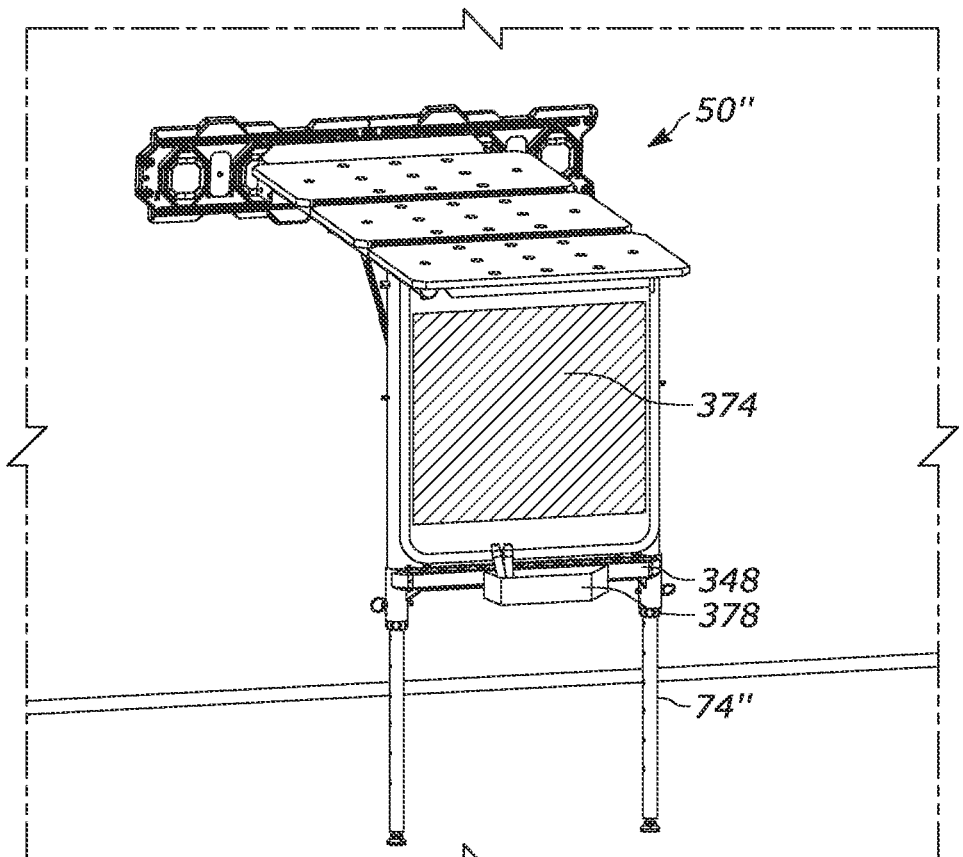
FIG. 47B is a perspective view of the alternate workbench of FIG. 38C including a marking board coupled to the legs.

FIGS. 47A and 47B illustrate perspective views of another embodiment of workbench 50". In this embodiment, the workbench 50" includes a marking board 374 mounted to the legs 74". The marking board 374 may be, without limitation, a dry erase white board. The alternate workbench 50" may further include a storage container 378 operable to hold objects 30. In the illustrated embodiment, the objects 30 held within the storage container 378 may be, without limitation, markers and erasers. In the illustrated embodiment, the container 378 is mounted on the fixed portion 348 (FIGS. 47A, 47B) of the legs 74". However, the container 378 may be otherwise mounted on the legs 74". As illustrated in FIGS. 47A and 47B, the marking board 374 and the container 378 are visible when the workbench 50" is in either the upper storage position or the use position.

Figure 48A:
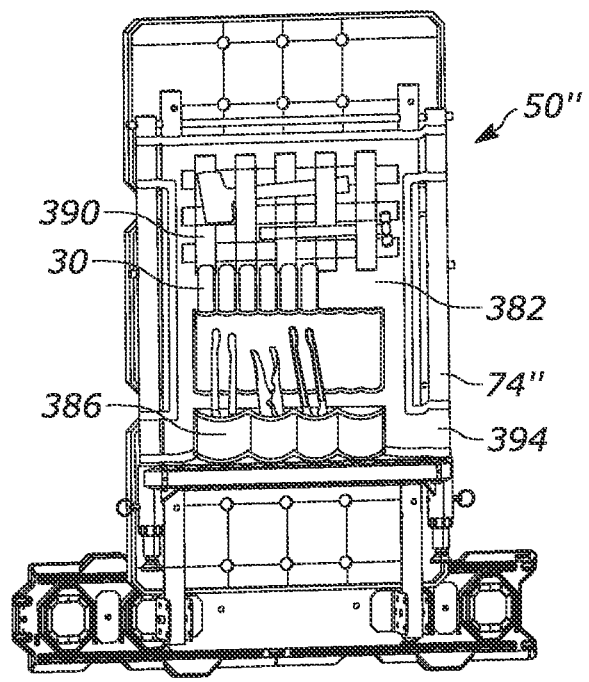
FIG. 48A is a perspective view of the alternate workbench of FIG. 38A including a soft tool storage attachment coupled to the legs.
Figure 48B:
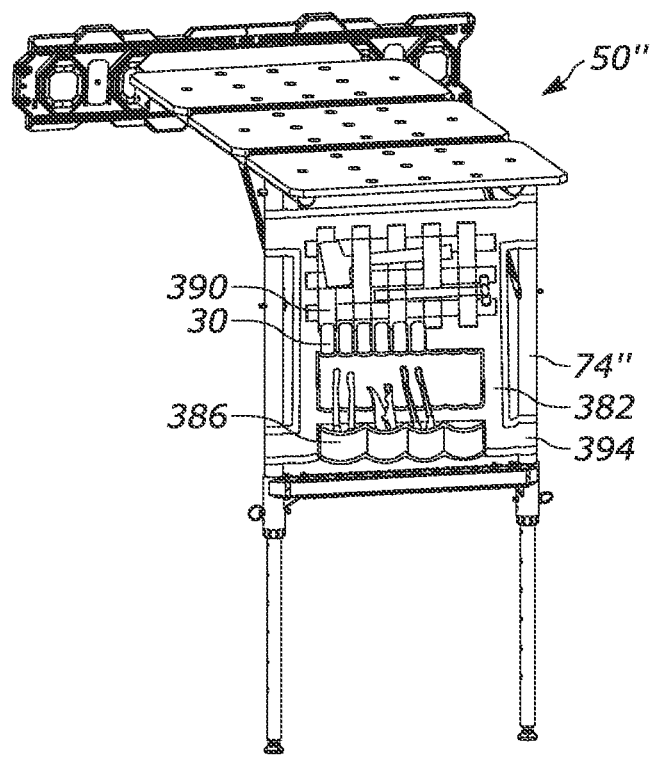
FIG. 48B is a perspective view of the alternate workbench of FIG. 38C including a soft tool storage attachment coupled to the legs.

FIGS. 48A and 48B illustrate perspective views of another embodiment of workbench 50". In this embodiment, the workbench 50" includes a soft tool storage attachment 382 configured to store objects 30 such as, for example, hand tools thereon. The soft tool storage attachment 382 may include pouches 386 and MOLLE (i.e., Modular Lightweight Load-carrying Equipment) loops 390 to storage various size objects 30 thereon. The soft tool storage attachment 382 may be secured to the legs 74" utilizing straps 394. The straps 394 may surround the legs 74", and optionally include hook and loop type fasteners for enhancing ease of assembly and disassembly of the soft tool storage attachment 382 from the legs 74". As illustrated in FIGS. 48A and 48B, the soft tool storage attachment 382 is visible when the workbench 50" is in either the upper storage position or the use position.

Figure 49:
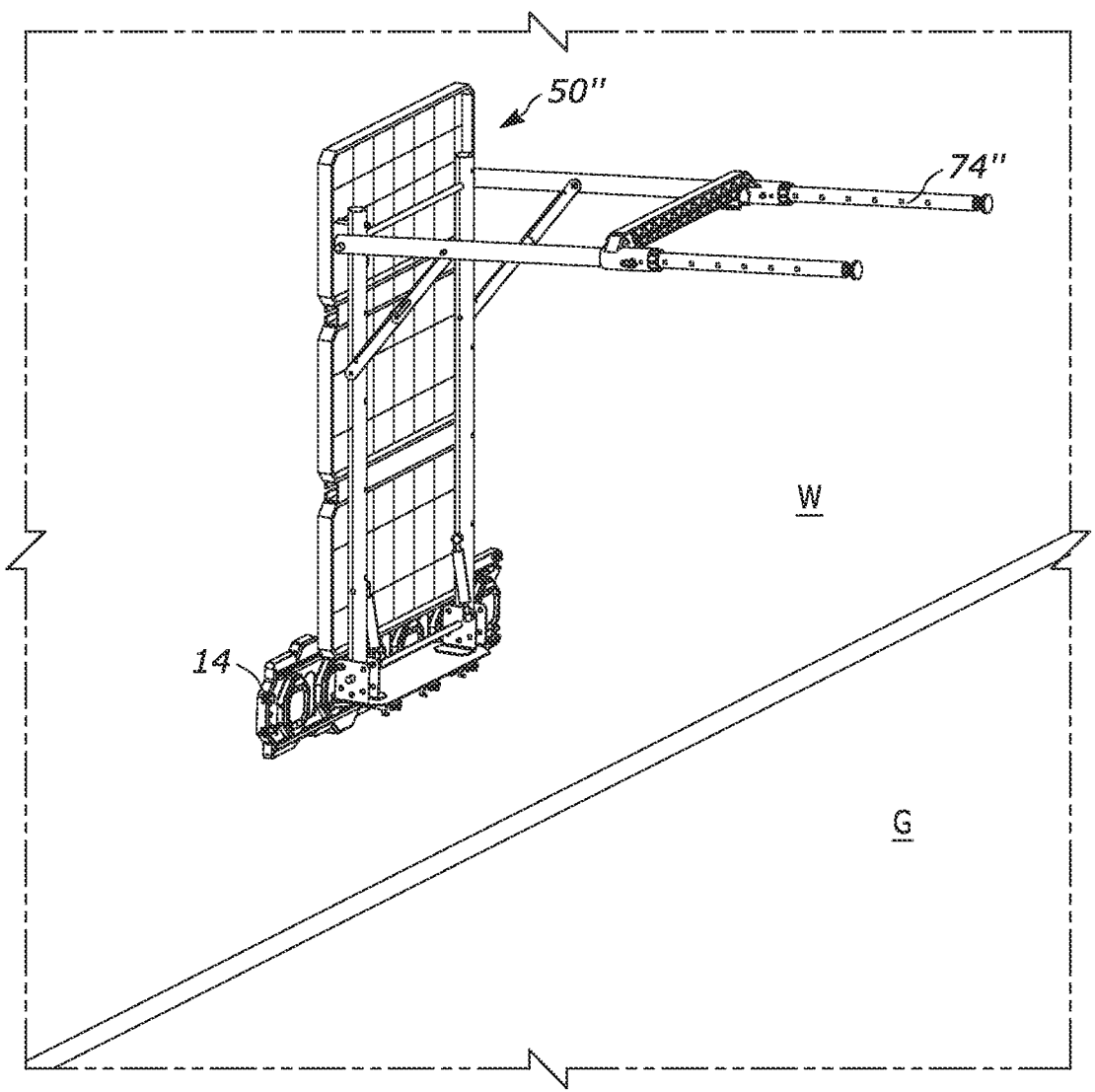
FIG. 49 is a perspective view of the alternate workbench of FIG. 38A with the legs in an extended position.

FIG. 49 illustrates the alternate workbench 50" with the legs 74" in an extended position perpendicular to the wall W and parallel to the ground G. In this position, the legs 74" can function as hooks for supporting objects 30 thereon.

Figure 50:
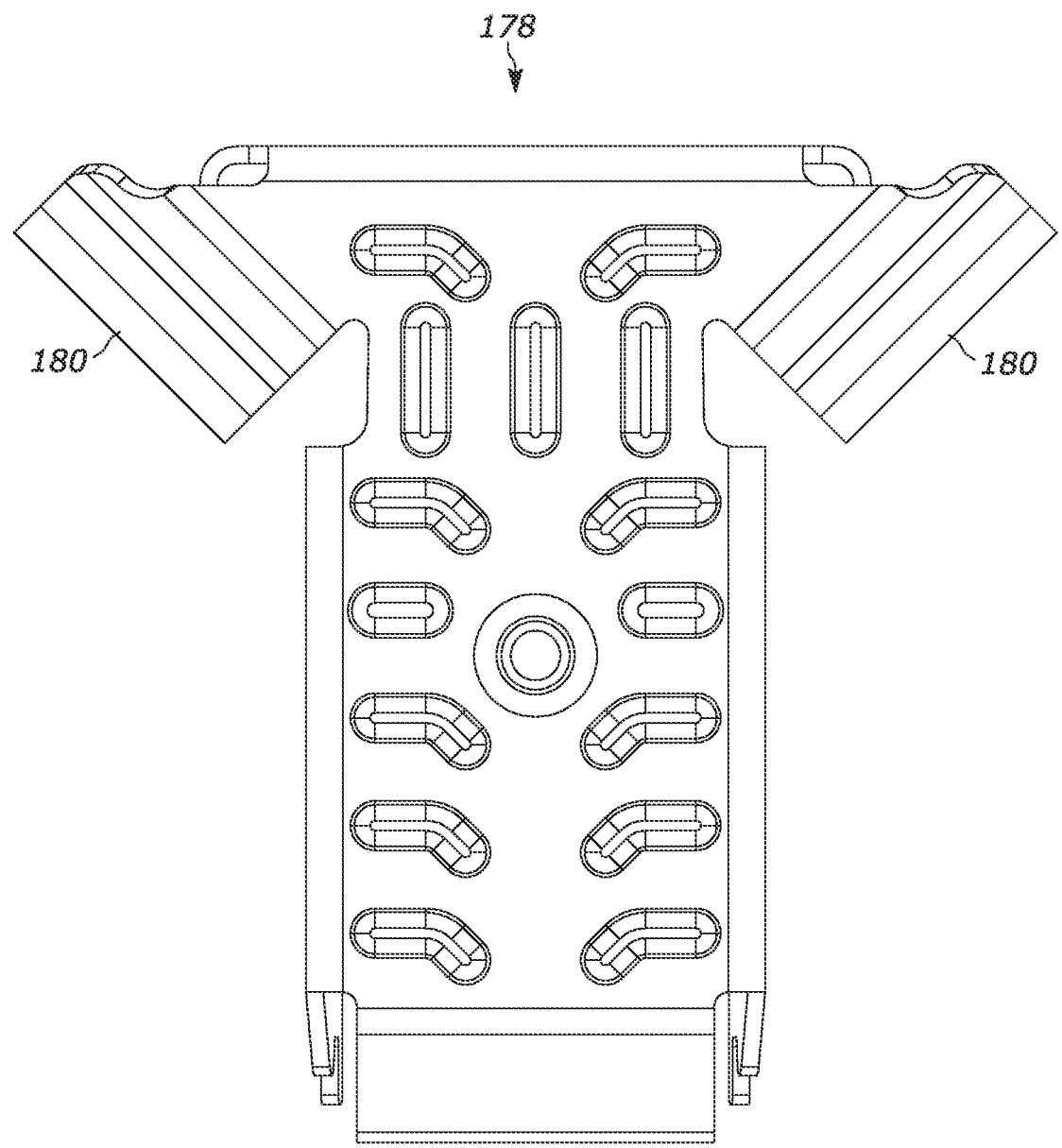
FIG. 50 is a front view of a mounting bracket.
Figure 51:
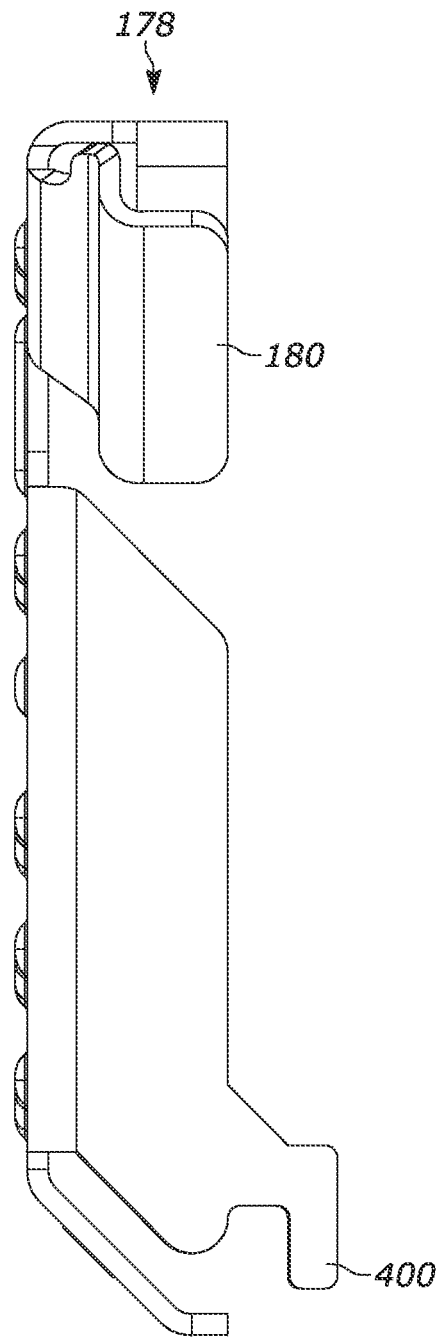
FIG. 51 is a side view of the mounting bracket of FIG. 50.
Figure 52:
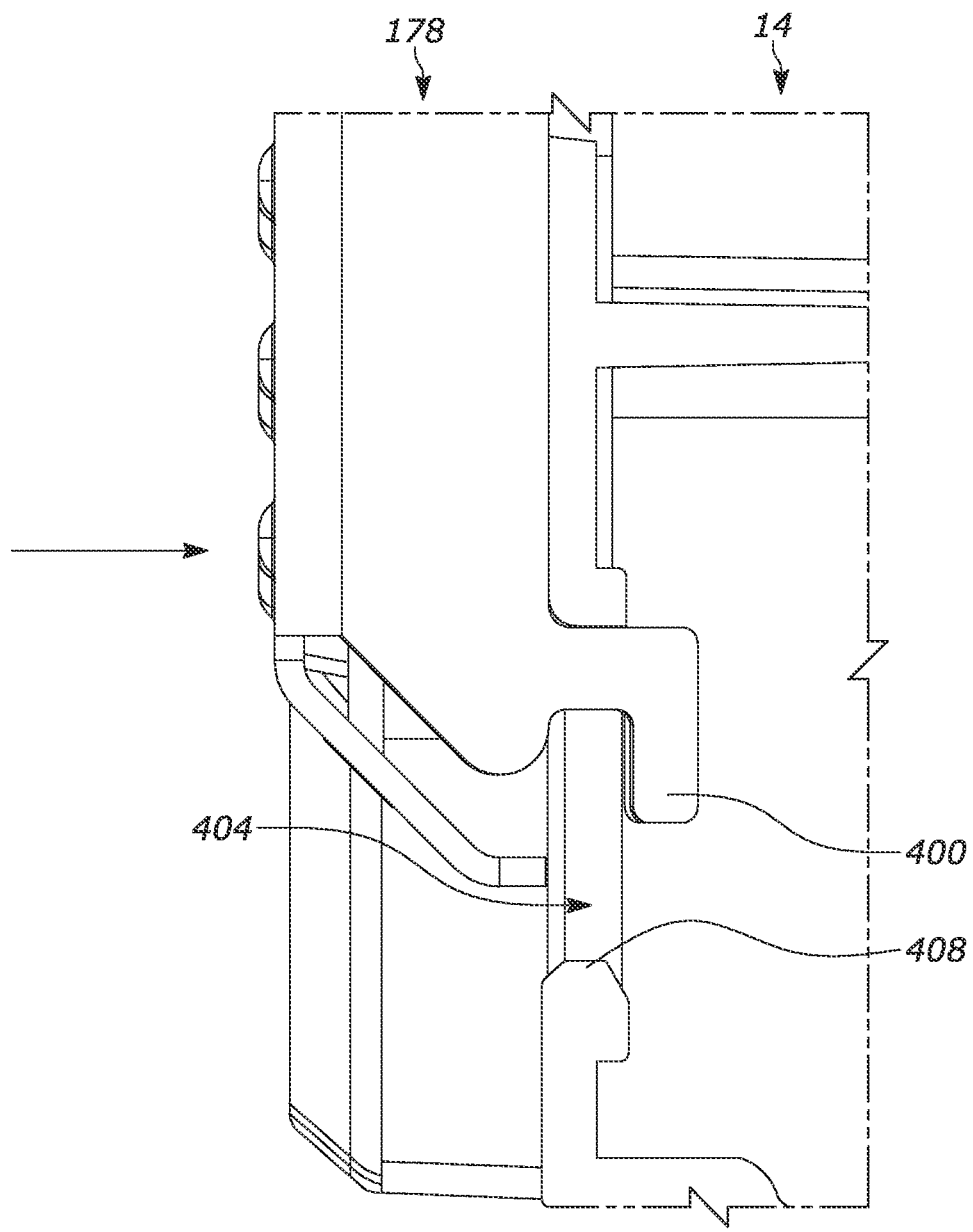
FIG. 52 is a side view of the mounting bracket of FIG. 50 in lateral position to engage the rail of FIG. 18.
Figure 53:
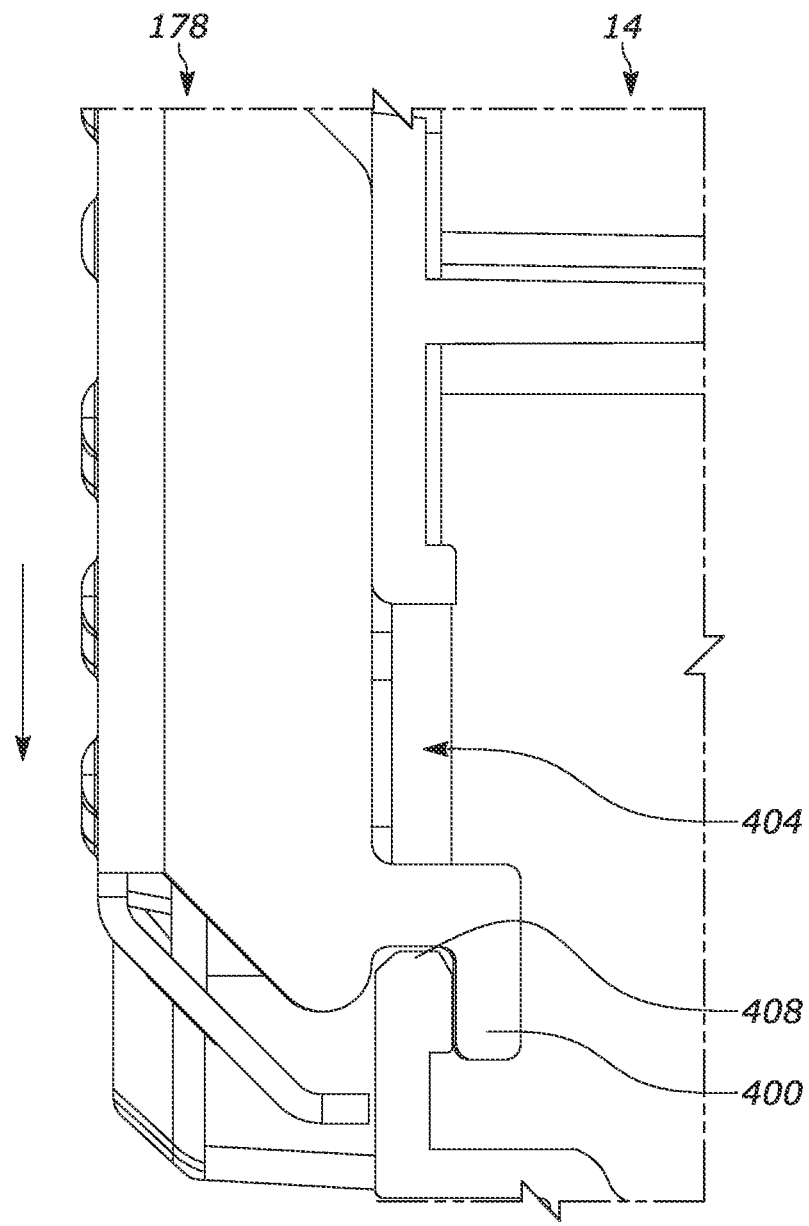
FIG. 53 is a side view of the mounting bracket of FIG. 50 engaging the rail of FIG. 18.

FIGS. 50-53 illustrate another mounting bracket 178. As shown in FIG. 50, the mounting bracket 178 includes hooks 180. The hooks 180 are cantilevered portions which are dimensioned such that one bracket hook 180 engages a portion of one cleat 22, and the second bracket hook 180 engages a portion of an adjacent cleat 22. As shown in FIG. 51, the mounting bracket 178 further includes a retaining member 400. The illustrated mounting bracket 178 includes two retaining members 400. The illustrated retaining members 400 project vertically and longitudinally with regards to the remainder of the mounting bracket 178. The retaining members 400 are dimensioned such that the retaining member 400 can engage the rail 14. As shown in FIG. 52, the retaining member 400 is passed laterally through a retention hole 404 (i.e., a retention feature) of the rail 14. In FIG. 52, the retaining member 400 is translated to a lateral position through the retention hole 404 such that the retaining member 400 is vertically aligned with a retaining tab 408 of the rail 14. As illustrated in FIG. 53, the mounting bracket 178 is then capable of translation vertically downward through the hole 404 such that the retaining member 400 engages the retaining tab 408 to secure the mounting bracket 178 to the rail 14. The hooks 180 also engage the cleats 22 when the retaining member 400 engages the retaining tab 408 such that the hooks 180, cleats 22, retaining member 400 and retaining tab 408 prevent vertical tilt of the mounting bracket 178 relative to the rail 14. In other words, the hooks 180, cleats 22, retaining member 400 and retaining tab 408 prevent the mounting bracket 178 from rotation relative to the rail 14.

Figure 54:
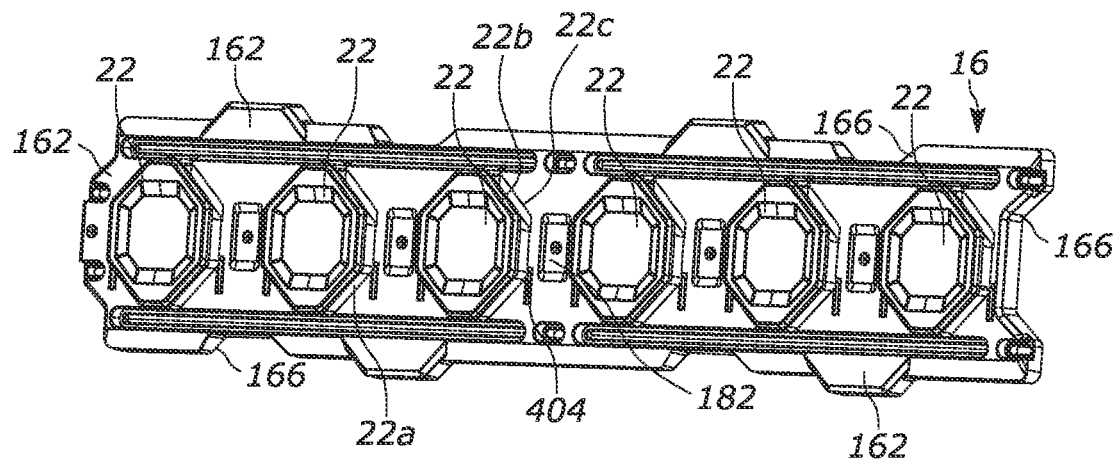
FIG. 54 is a perspective view of another rail.
Figure 55:
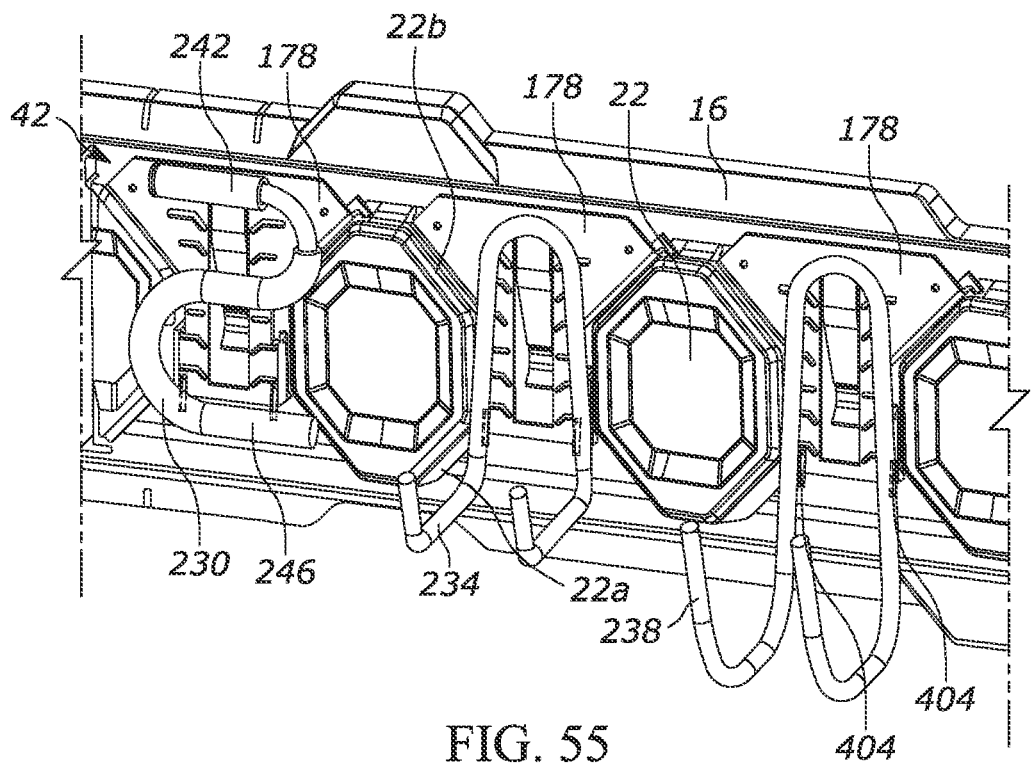
FIG. 55 is a perspective view of the S-hook, the first generic hook, and the second generic hook each supported on the rail of FIG. 54 via the mounting bracket.

FIGS. 54 and 55 illustrate another rail 16 with multiple cleats 22. The cleats 22 of the rail 16 include a bluff 22a which is integrally formed with the rail 16. The bluff 22a connects the outstanding portion 22b of the cleat 22 to the rail 16. The outstanding portion 22b is raised form the remainder of the rail 16. The outstanding portion 22b can be engaged by either the object 30 directly (e.g., as in the tool holder 310 of FIGS. 32-33) or by the mounting bracket 178, with the mounting bracket 178 holding, for example and without limitation, the S-hook 230, the first U-hook 234, or the second U-hook 238 as illustrated in FIG. 21. The S-hook 230, the first U-hook 234, and/or the second U-hook 238 can then support an object 30 thereon.

In the illustrated embodiment (FIG. 54), bluffs 22a are provided adjacent each outstanding portion 22b on opposite lateral sides of the outstanding portion 22b on a single vertical side of each cleat 22. In the illustrated embodiment, bluffs 22a connect the lower portion of the cleat 22 to the rail 16. Adjacent the upper portion of the cleat 22, through slots 22c are provided in the rail 16. The through slots 22c extend diagonally between the lower portion of the rail 16 and the upper portion of the rail 16 and generally correspond with the shape outstanding portion 22b of the cleat 22. Rather than slots 22c adjacent the both the top and bottom portions of each cleat (see e.g., FIGS. 10-11A), the rail 16 of FIGS. 54 and 55 may include bluffs 22a adjacent the lower portion of the rail 16 and slots 22c adjacent the upper portion of the rail 16. The bluffs 22a thereby form a continuous planar surface that is coextensive with the lower edges of the cleat 22. In view of the rail 15 and the rail 16, the rail 14, 15, 16 may be provided with a combination of bluffs 22a and through slots 22c around the periphery of the outstanding portion 22b.

The objects 30 that engage the system 10 may be mounted to an object support which engages a bracket 178. The object support may be, without limitation, the previously described shelves 34, storage boxes 38, hanging attachments, tool holders 46, workbenches 50, and the like. The object support may be, without limitation, the previously described shelves 190, crate 194, tool boxes 174a, 174b, S-hook 230, first U-hook 234, second U-hook 238, first hand tool organizer 250, second hand tool organizer 254, wire basket 258, bicycle hook 260, third U-hook 262, sporting good holder 266, driver holder 274, tool interface 294, battery holder 306, tool holder 310. Other such object supports may be provided on the system 10 to support an object 30 or multiple objects 30 on the wall W.

It should be appreciated that the objects 30 to engage the system 10 are not limited to the objects 30 described herein. For example, the objects may also include, but are not limited to the following: lights, a fold down seat, a fold out seat, a step stool, a stool, batteries, holders, extension plugs, cord routing mechanisms, dust collection channels, tool bit storage, trash cans, wireform trash bag holders, fans, heaters, drop cloths, storage for rolling craft paper, a paper towel holder, magnetic holding strips, peg boards, dolly mounting structures, storage bins, parf fixture mechanisms, vice storage mechanisms, bike mounting mechanisms, and drying racks. Other objects are possible.

Although the disclosure has been described in detail with reference to certain embodiments, variations and modifications exist within the scope and spirit of one or more independent aspects as described. Various features and advantages are set forth in the following claims.

What is claimed is:

1. A storage support system configured to support an object on a support surface, the storage support system comprising:
    a mount including an upper edge and a lower edge, wherein the mount extends along a longitudinal axis; and
    a plurality of cleats, each of the cleats comprising a projecting portion projecting from a surface of the mount and an outstanding portion coupled to the projecting portion, each of the cleats including a first upper cleat edge and a second upper cleat edge oriented non-parallel relative to the first upper cleat edge, the first upper cleat edge oriented diagonally relative to the longitudinal axis in a top to bottom direction of the mount, each of the first upper cleat edge and the second upper cleat edge being configured to support the object.

2. The storage support system of claim 1, further comprising a second mount engaging at least one of the plurality of the cleats of the mount, and wherein the object is removably secured to either the mount or the second mount.

3. The storage support system of claim 1, wherein the plurality of cleats arranged at regular distances along the longitudinal axis,
    the storage support system further comprises a second mount including a second plurality of cleats arranged corresponding to the regular distance along the longitudinal axis, and
    the storage support system further comprises an extension to attach the mount to the second mount with the longitudinal axes of the first plurality of cleats and the second plurality of cleats being aligned.

4. The storage support system of claim 3, wherein the mount and the second mount are positioned adjacent to each other along the longitudinal axis such that cleats at adjacent ends of the mount and the second mount are disposed from each other at the regular distance.

5. The storage support system of claim 1, further comprising a bracket configured to engage at least one of the plurality of cleats to secure the bracket to the mount, wherein the bracket is configured to support an object.

6. The Previously Presented of claim 5, wherein the bracket is configured to engage the first upper cleat edge of one of the plurality of cleats and the second upper cleat edge of a second one of the plurality of cleats.

7. The storage support system of claim 5, wherein the bracket further comprises a mounting tab,
    the mount further comprises a detent positioned between adjacent cleats of the plurality of cleats, and
    the mounting tab is configured to engage the detent to further secure the bracket to the mount.

8. The storage support system of claim 5, wherein the bracket further comprises a retaining member,
    the mount further comprises a retention feature, and
    the retaining member is configured to engage the retention feature to further secure the bracket to the mount.

9. The storage support system of claim 1, wherein each of the plurality of cleats further comprises a third upper cleat edge that is parallel relative to the upper edge of the mount.

10. The storage support system of claim 9, wherein the third upper cleat edge is located between the first upper cleat edge and the second upper cleat edge.

11. The storage support system of claim 1, further wherein the second upper cleat edge is oriented diagonally relative to the longitudinal axis in the top to bottom direction of the mount.

12. A modular storage system configured to support an object on a support surface, the modular support system comprising:
    a mount including,
        a surface and a plurality of cleats projecting from the surface, each cleat having an outstanding portion extending from the surface diagonally in a top to bottom direction relative to a longitudinal axis of the mount, and
        a retention feature comprising a retaining tab;
    a bracket for removably supporting the object, the bracket including,
        a bracket hook extending in a diagonal direction relative to a body of the bracket and configured to engage the diagonal outstanding portion of one of the plurality of cleats to secure the bracket to the mount between two adjacent cleats, and
        a retaining member configured to engage the retaining tab of the retention feature to inhibit disengagement of the bracket hook from the cleat.

13. The system of claim 12, wherein the connections between the outstanding portion and the bracket hook and between the retaining member and the retaining tab inhibit rotation of the bracket relative to the mount.

14. The system of claim 12, wherein the connections between the outstanding portion and the bracket hook and between the retaining member and the retaining tab provide two distinct points of contact between the bracket and the mount.

15. The system of claim 12, wherein the bracket is dimensioned with the bracket hook and the retaining member such that in the assembly of the system, the bracket is translated laterally with the retaining member passing through the retention feature in a lateral direction, and the bracket is translated vertically with the retaining member engaging the retaining tab and the bracket hook engaging the outstanding portion.

16. The system of claim 12, wherein the mount includes a bluff between the outstanding portion and the mount along a portion of each cleat.

17. The system of claim 16, wherein the mount includes a through slot adjacent the outstanding portion along another portion of each cleat.

18. The system of claim 12, wherein the mount includes opposite ends which each include a mating feature configured to engage corresponding mating features of a second mount.

19. The system of claim 12, wherein the system further includes an object support mounted on the bracket, the object support configured to secure the object to the bracket.

20. The system of claim 12, wherein the retention feature includes a hole in the mount.

21. A modular storage system configured to support an object on a support surface, the modular support system comprising:

a mount including a plurality of cleats, each of the plurality of cleats including an outstanding portion projecting from the mount diagonally in a top to bottom direction relative to a longitudinal axis of the mount, and a workbench having a work surface pivotally movable between a stored position, in which the work surface is generally parallel with the support surface, and a deployed position, in which the work surface is generally perpendicular with the support surface, the workbench comprising a fixed portion, the fixed portion including a mounting attachment comprising a bracket, the bracket being configured to engage the outstanding portion of any one of the plurality of cleats to secure the bracket to the mount, and a hinge coupling the fixed portion to the work surface such that the work surface is movable relative to the mounting attachment.

22. The system of claim 21, wherein the workbench further comprises spring dampers configured to assist movement of the workbench between the stored position and the deployed position.

23. The system of claim 21, wherein the workbench further comprises a leg pivotally coupled to the work surface by a second hinge opposite the hinge.

24. The system of claim 23, wherein the leg includes a telescopic portion which is translatable to adjust the height of the work surface.

25. The system of claim 24, wherein the telescopic portion terminates in a foot which is received by the telescopic portion and is pivotably adjustable to provide fine adjustment of the height of the work surface.

26. The system of claim 23, further comprising a support interface coupled to the leg, the support interface being configured to support an object on the leg.

27. The system of claim 21, wherein the work surface further comprises channels positioned in a top portion thereof.

\* \* \* \* \*